United States Patent
Sugimoto et al.

(10) Patent No.: US 8,345,285 B2
(45) Date of Patent: Jan. 1, 2013

(54) DISPLAYING JOBS IN PRIORITY ORDER WITH ELAPSED TIME ON INFORMATION PROCESSING APPARATUS

(75) Inventors: Yasuaki Sugimoto, Hachioji (JP); Takeshi Nakajima, Hino (JP)

(73) Assignee: Konica Minolta Business Technologies, Inc. (JP)

( * ) Notice: Subject to any disclaimer, the term of this patent is extended or adjusted under 35 U.S.C. 154(b) by 717 days.

(21) Appl. No.: 12/359,948

(22) Filed: Jan. 26, 2009

(65) Prior Publication Data
US 2009/0195820 A1 Aug. 6, 2009

(30) Foreign Application Priority Data
Feb. 5, 2008 (JP) .................... 2008-025268

(51) Int. Cl.
*G06F 3/12* (2006.01)
*G06K 15/00* (2006.01)
(52) U.S. Cl. ............... 358/1.15; 358/1.13; 358/1.14; 358/1.16
(58) Field of Classification Search .................. None
See application file for complete search history.

(56) References Cited

U.S. PATENT DOCUMENTS
2007/0168387 A1  7/2007  Matoba

FOREIGN PATENT DOCUMENTS
| JP | 2002-137500 | 5/2002 |
| JP | 2005-343034 | 12/2005 |
| JP | 2007-052490 | 3/2007 |
| JP | 2007-142912 | 6/2007 |

OTHER PUBLICATIONS

Matsumoto et al., "Imaging Apparatus"; JP Pub Date May 2002; Machine translation in english of JP Pub No. 2002-137500.*
European Search Report for EP 09151821, mailed Apr. 16, 2010, 7 pgs.
Japanese Notification of Reason for Refusal issued by JPO on Feb. 18, 2010, in connection with Appl. No. JP2008-025268, 2 pgs.
Translation of Japanese Notification of Reason for Refusal issued by JPO on Feb. 18, 2010, in connection with Appl. No. JP2008-025268, 3 pgs.

* cited by examiner

*Primary Examiner* — Benny Q Tieu
*Assistant Examiner* — Haris Sabah
(74) *Attorney, Agent, or Firm* — Squire Sanders (US) LLP

(57) ABSTRACT

An information processing apparatus including:
an operation display section for displaying a screen to set processing conditions relating to a job and for receiving an operation to set the processing conditions relating to the job;
a generation section for generating a job under the processing conditions set by the operation with the operation display section;
a storage section for storing job information comprising the processing conditions relating to the job generated by the generation section;
a measuring section for measuring an elapsed time from a time when the job is generated by the generation section; and
a control section which displays a plurality of previously generated jobs in a predetermined order using the job information on the operation display section, and replaces an order of the plurality of the jobs based on contents of the operation display section when the processing conditions is set and the elapsed time during displaying.

13 Claims, 26 Drawing Sheets

JOB HISTORY TABLE

| JOB EXECUTION ORDER | EXECUTION TIME (DATE AND TIME) | SETTING | | | | | | OPERATION | | | USER NAME |
|---|---|---|---|---|---|---|---|---|---|---|---|
| | | | | | | | | NUMBER OF HIERARCHICAL LEVELS | NUMBER OF SETTINGS | NUMBER OF SCREEN CHANGES | |
| 1 | 13:00, JUNE 27, 2007 | [2 IN 1] | | | | | | 2 | 1 | 1 | X |
| 2 | 11:00, JUNE 27, 2007 | [NON IMAGE AREA ERASING] | | | | | | 3 | 1 | 3 | X |
| 3 | 17:00, JUNE 26, 2007 | [2 IN 1] | [TEXT/PHOTO] | [BINDING MARGIN] | | | | 3 | 4 | 5 | X |
| 4 | 14:00, JUNE 26, 2007 | FILE TRANSMISSION (SMB) | HOST NAME JUNE | GROP NAME TOKYO | USER SUGIMOTO | PASSWORD ******* | | 4 | 5 | 11 | X |
| 5 | 17:00, JUNE 25, 2007 | FILE TRANSMISSION (SMB) | HOST NAME JUNE | GROP NAME TOKYO1 | USER SUGIMOTO | PASSWORD ******* | BROADCAST ADDRESS 1 | 4 | 10 | 21 | X |
| | | FILE TRANSMISSION (SMB) | HOST NAME JUNE | GROP NAME TOKYO2 | USER NAKAJIMA | PASSWORD ******* | BROADCAST ADDRESS 2 | | | | |

FIG. 8 (A)
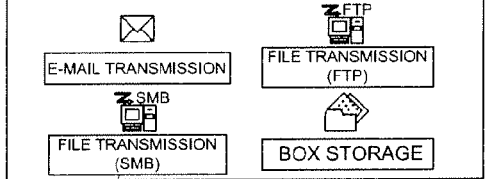
FIG. 8 (B)
FIG. 8 (C)
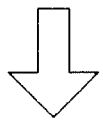

FIG. 9 (D)

Screen 74(26):
- JOB CHECK | 07/07/02 15 43
- SPECIFY THE HOST NAME (IP ADDRESS) OF THE RECEIVER
- NUMBER OF ADDRESSES: 000
- AVAILABLE MEMORY CAPACITY: 100%
- BROADCAST ADDRESS LIST
- HOST NAME: 10.12.15.150
- On-screen keyboard (← → ERASE ... SPACE; 1-0 -^; qwerty...; asdf...; zxcv... Shift)
- CANCEL | OK (87)

FIG. 9 (E)

Screen 73(26):
- JOB CHECK | 07/07/02 15 44
- INPUT SETTING VALUES FOR TRANSMISSION
- NUMBER OF ADDRESSES: 000
- AVAILABLE MEMORY CAPACITY: 100%
- BROADCAST ADDRESS LIST
- FILE TRANSMISSION SMB | NEXT ADDRESS
- 84 — HOST NAME: 10. 12. 15. 150 | REFERENCE
- FILE PATH
- USER NAME
- PASSWORD
- CANCEL | OK

FIG. 9 (F)

Screen 75(26):
- JOB CHECK | 07/07/02 15 46
- INPUT THE FOLDER NAME OF THE RECEIVER
- NUMBER OF ADDRESSES: 000
- AVAILABLE MEMORY CAPACITY: 100%
- BROADCAST ADDRESS LIST
- FILE PATH
- On-screen keyboard (← → ERASE ... SPACE; 1-0 -^; qwerty...; asdf...; zxcv... Shift)
- CANCEL | OK (87)

| JOB CHECK | 07/07/02 15 50 |
|---|---|

INPUT THE FOLDER NAME OF THE RECEIVER

NUMBER OF ADDRESSES: 001
AVAILABLE MEMORY CAPACITY: 100%

BROADCAST ADDRESS LIST

¥¥10. 12. 15. 150¥¥Ju

FILE PATH ¥¥July¥sea

← → ERASE SPACE
1 2 3 4 5 6 7 8 9 0 - ^
q w e r t y u i o p @ [
a s d f g h j k l ; : ]
z x c v b n m , . / ¥ Shift

CANCEL  OK

| JOB CHECK | 07/07/02 15 51 |
|---|---|

INPUT SETTING VALUES FOR TRANSMISSION

NUMBER OF ADDRESSES: 001
AVAILABLE MEMORY CAPACITY: 100%

BROADCAST ADDRESS LIST

¥¥10. 12. 15. 150¥¥Ju

FILE TRANSMISSION SMB   NEXT ADDRESS

HOST NAME  10. 12. 15. 170
FILE PATH  ¥¥July¥sea           REFERENCE
USER NAME
PASSWORD

85

CANCEL  OK

| JOB CHECK | 07/07/02 15 51 |
|---|---|

INPUT THE USER NAME OF THE RECEIVER

NUMBER OF ADDRESSES: 001
AVAILABLE MEMORY CAPACITY: 100%

BROADCAST ADDRESS LIST

¥¥10. 12. 15. 150¥¥Ju

USER NAME  Nakajima

← → ERASE SPACE
1 2 3 4 5 6 7 8 9 0 - ^
q w e r t y u i o p @ [
a s d f g h j k l ; : ]
z x c v b n m , . / ¥ Shift

CANCEL  OK

PRESSING START KEY → JOB EXECUTE

FIG. 15

JOB HISTORY TABLE

| JOB EXECUTION ORDER | EXECUTION TIME (DATE AND TIME) | SETTING | | | | OPERATION | | | USER NAME |
|---|---|---|---|---|---|---|---|---|---|
| | | | | | | NUMBER OF HIERARCHICAL LEVELS | NUMBER OF SETTINGS | NUMBER OF SCREEN CHANGES | |
| 1 | 13:00, JUNE 27, 2007 | | | [2 IN 1] | | 2 | 1 | 1 | × |
| 2 | 11:00, JUNE 27, 2007 | | | [NON IMAGE AREA ERASING] | | 3 | 1 | 3 | × |
| 3 | 17:00, JUNE 26, 2007 | [2 IN 1] | | [TEXT/PHOTO] | [BINDING MARGIN] | 3 | 4 | 5 | × |
| 4 | 14:00, JUNE 26, 2007 | FILE TRANSMISSION (SMB) | HOST NAME JUNE | GROP NAME TOKYO | USER SUGIMOTO | PASSWORD ******* | 4 | 5 | 11 | × |
| 5 | 17:00, JUNE 25, 2007 | FILE TRANSMISSION (SMB) | HOST NAME JUNE | GROP NAME TOKYO1 | USER SUGIMOTO | PASSWORD ******* | BROADCAST ADDRESS 1 | 4 | 10 | 21 | × |
| | | FILE TRANSMISSION (SMB) | HOST NAME JUNE | GROP NAME TOKYO2 | USER NAKAJIMA | PASSWORD ******* | BROADCAST ADDRESS 2 | | | | |

FIG. 16

| | | CORRELATION NUMBER CALCULATION DISPLAY SCREEN 100(26) ||||||
| --- | --- | --- | --- | --- | --- | --- |
| | | (13:00, JUNE 27, 2007) ||||||
| | | FACTORS FOR [CALCULATING CORRELATION NUMBERS] ||||||
| JOB EXECUTION ORDER | JOB NAME | PARAMETER FREELY SELECTED BY A USER (MORE THAN ONE PARAMETER CAN BE SELECTED) ||| ESSENTIAL PARAMETERS | CORRELATION NUMBER |
| | | NUMBER OF HIERARCHICAL LEVELS | NUMBER OF SETTINGS | NUMBER OF SCREEN CHANGES | TIME ELAPSED | |
| 1 | [2 IN 1] PRINTING | 2 | 1 | 1 | 0 | A |
| 2 | [NON IMAGE AREA ERASING] PRINTING | 3 | 1 | 3 | 2 | B |
| 3 | [2 IN 1] [TEXT/PHOTO] [BINDING MARGIN] PRINTING | 3 | 4 | 5 | 20 | C |
| 4 | [SCAN TO SMB] TRANSMISSION | 4 | 5 | 11 | 23 | D |
| 5 | [SCAN TO SMB] BROADCAST TRANSMISSION | 4 | 10 | 21 | 44 | E |

FIG. 17

CORRELATION NUMBER CALCULATION DISPLAY SCREEN  101(26)
(19:00, JUNE 27, 2007)

| FACTORS FOR [CALCULATING CORRELATION NUMBERS] ||||||
| JOB EXECUTION ORDER | JOB NAME | PARAMETER FREELY SELECTED BY A USER (MORE THAN ONE PARAMETER CAN BE SELECTED) ||| ESSENTIAL PARAMETERS | CORRELATION NUMBER |
| | | NUMBER OF HIERARCHICAL LEVELS | NUMBER OF SETTINGS | NUMBER OF SCREEN CHANGES | TIME ELAPSED | |
|---|---|---|---|---|---|---|
| 1 | [2 IN 1] PRINTING | 2 | 1 | 1 | 6 | A |
| 2 | [NON IMAGE AREA ERASING] PRINTING | 3 | 1 | 3 | 8 | B |
| 3 | [2 IN 1] [TEXT/PHOTO] [BINDING MARGIN] PRINTING | 3 | 4 | 5 | 26 | C |
| 4 | [SCAN TO SMB] TRANSMISSION | 4 | 5 | 11 | 29 | D |
| 5 | [SCAN TO SMB] BROADCAST TRANSMISSION | 4 | 10 | 21 | 50 | E |

FIG. 18

| | SETTING-RELATED COEFFICIENT | INITIAL | +3h | +6h | +10h | +24h | +48h | +100h |
|---|---|---|---|---|---|---|---|---|
| A: [2 IN 1] PRINTING | 1 | 0 | 3 | 6 | 10 | 24 | 48 | 100 |
| B: [NON IMAGE AREA ERASING] | 3 | 2 | 5 | 8 | 12 | 26 | 50 | 102 |
| C: [2 IN 1][TEXT/PHOTO][BINDING MARGIN] PRINTING | 5 | 20 | 23 | 26 | 30 | 44 | 68 | 120 |
| D: [SCAN TO SMB] TRANSMISSION | 11 | 23 | 26 | 29 | 33 | 47 | 71 | 123 |
| E: [SCAN TO SMB] BROADCAST TRANSMISSION | 21 | 44 | 47 | 50 | 54 | 68 | 92 | 144 |

| 0 | 3 | 6 | 10 | 24 | 48 | 100 |
|---|---|---|---|---|---|---|
| -0.69897 | -0.09691 | 0.146128 | 0.3424227 | 0.69897 | 0.991226 | 1.305351 |
| -0.07395 | 0.026394 | 0.0850908 | 0.1383244 | 0.24413125 | 0.3362 | 0.437956 |
| 0.12465 | 0.136248 | 0.1464788 | 0.1584783 | 0.1908485 | 0.227976 | 0.276763 |
| 0.061931 | 0.066581 | 0.070741 | 0.0756826 | 0.08929738 | 0.105306 | 0.126768 |
| 0.04544 | 0.046775 | 0.0480286 | 0.0495901 | 0.05427996 | 0.060453 | 0.069638 |

CALCULATION FORMULA
$z = \log((\text{TIME ELAPSED} + 1)y)/x$
z: CORRELATION NUMBER
y: WEIGHT DETERMINING COEFFICIENT WITH RESPECT TO TIME AXIS
x: SETTING-RELATED COEFFICIENT

FIG. 26

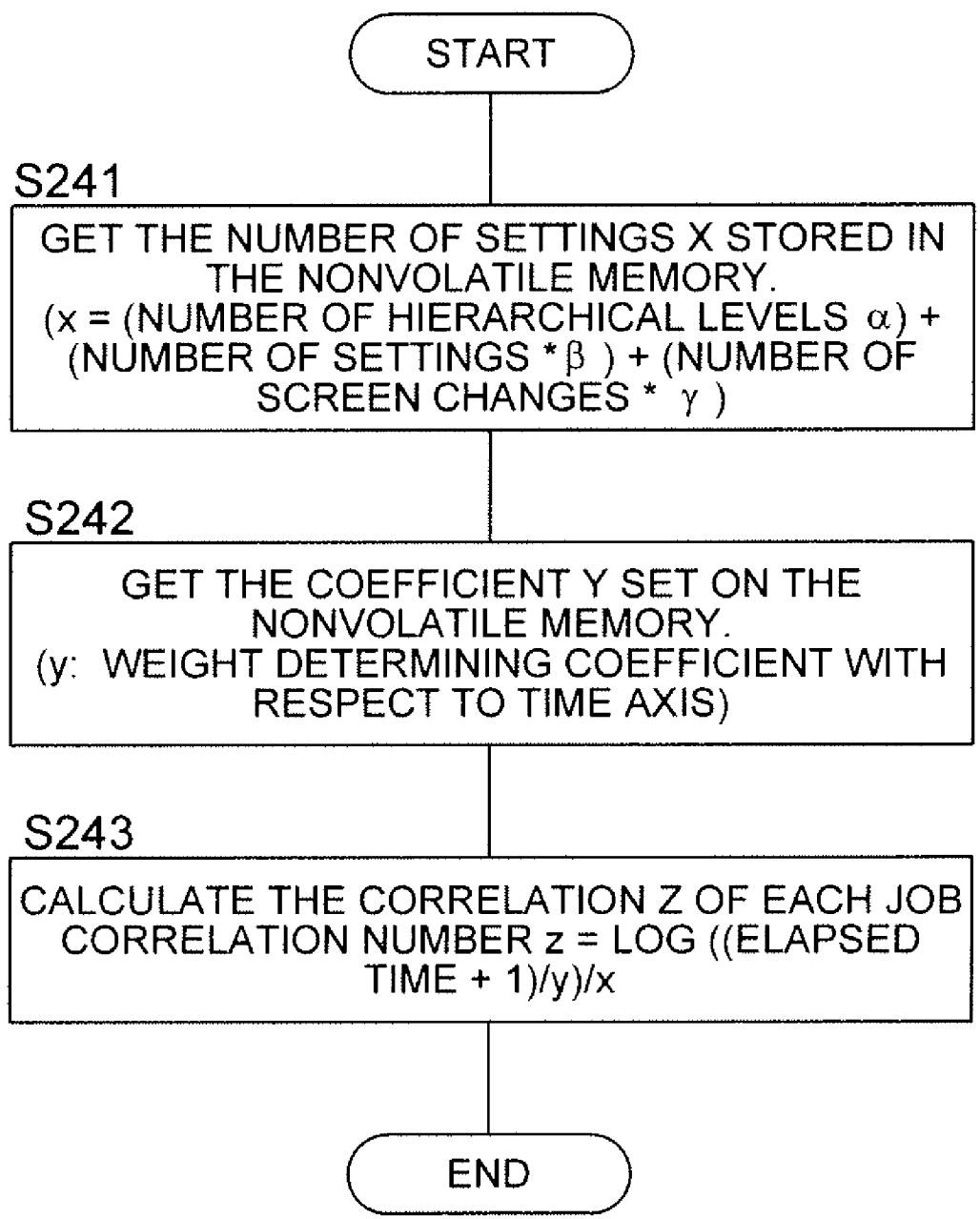

START

S241
GET THE NUMBER OF SETTINGS X STORED IN THE NONVOLATILE MEMORY.
(x = (NUMBER OF HIERARCHICAL LEVELS $\alpha$) + (NUMBER OF SETTINGS * $\beta$ ) + (NUMBER OF SCREEN CHANGES * $\gamma$ )

S242
GET THE COEFFICIENT Y SET ON THE NONVOLATILE MEMORY.
(y: WEIGHT DETERMINING COEFFICIENT WITH RESPECT TO TIME AXIS)

S243
CALCULATE THE CORRELATION Z OF EACH JOB
CORRELATION NUMBER z = LOG ((ELAPSED TIME + 1)/y)/x

END

DISPLAYING JOBS IN PRIORITY ORDER WITH ELAPSED TIME ON INFORMATION PROCESSING APPARATUS

RELATED APPLICATION

The present application is based on Patent Application No. 2008-025268 filed at the Japan Patent Office on Feb. 5, 2008 and which is hereby incorporated herein in its entirety.

TECHNICAL FIELD

The present invention relates to an information processing apparatus and program, particularly to an information processing apparatus having a function of displaying the history of job settings having been executed, and a program for running this information processing apparatus.

BACKGROUND

When using a multi-functional peripheral having a plurality of types of modes such as copying, scanning and faxing modes, the pattern of usage in each mode for each user often tends to appear. For example, in the copying mode, series of setting such as "specific density, simplex setting and 2 in 1" is often selected; in the scanning mode, "a specific file format (PDF: Portable Document Format (registered trademark)), specific resolution (200 dpi), a specific read-in mode (simplex)" is usually selected; and in the fax machine mode, "a specific transmitter (user A)/IP (Internet Protocol)-FAX/re-directed transmission" is often chosen. As shown above, a user tends to select a specific pattern in each mode according to his preference or the purpose of use.

In such a status of usage, if the multi-functional peripheral requests the user to select a setting every time a mode is used, the user must repeat the same operations for each mode. This will consume user's time and effort. Particularly when each mode contains a great number of functions and alternatives that must be often utilized, this will result in an increased number of items to be set (the number of settings), a deeper hierarchical level of operation in setting, and an increased number of operation screen changes. This leads to complicated operations and time-consuming setting. Thus, if the same complicated operations must be repeated for every use of the multi-functional peripheral function, the user will be exposed to a growing stress. Further, when the user wants to correct a job error after having set or executed it, the user has to repeat the same operations from the very beginning. This will cause a great deal of inconvenience to the user.

To solve this problem, some multi-functional peripheral is provided with the function wherein the settings of the job having been executed (processing conditions) are stored in a nonvolatile memory and the history is displayed in chronological order. From this history, the user selects a desired job, and the settings of that job are reflected on the new job settings. Thus, the previous settings can be effectively utilized in this multi-functional peripheral. Further, this function also allows partial changes, in addition to a direct use of the previous settings. For example, when a user wants to correct a setting error after execution, the user can use the last job setting to correct the error, or can easily create a new job in conformity to correct settings.

One of the techniques of utilizing the previous settings is disclosed, for example, in the Japanese Unexamined Patent Application Publication No. 5-298377 wherein the inputted data is stored, and the input history is displayed in a menu format in such a way that the data corresponding to the input history selected therefrom can be used for the next input. Another example of the aforementioned techniques is found in the Japanese Unexamined Patent Application Publication No. 2005-25656 wherein the history of the operations performed by the user is stored in a memory, and the menu screen for the last operations is displayed at the time of the next access according to the history information (by quick transition to a deep level of hierarchy), whereby the user is allowed to start the operation from the menu screen for the last operations.

When using various types of modes in a multi-functional peripheral, setting can be completed by simple operations in some cases, but in other cases, a user is forced to perform complicated operations due to a greater number of settings, an increased number of the hierarchical operations or a large number of screen changes. Thus, when the setting requires more complicated operations, use of the previous settings leads to a substantial simplification of the operation and more effective setting.

In the meantime, resetting of the job having been executed based on incorrect setting is often performed shortly after job execution, for example, in 30 minutes through 1 hour subsequent to execution of the job. If much time has not yet passed after execution of the job, only a part of the setting is corrected using the history display function in many cases, even if the setting of the job is simple. However, the need for the job of simple setting is reduced with the lapse of time. For example, three through four hours after execution, the possibility of using the job setting is considerably reduced. Rather, there is an increase in the possibility of using the job of complicated setting having been executed several days before. As described above, the previous settings of the job required by the user depend on two factors—operations performed at the time of job setting and elapsed time.

By contrast, mere display of the history of job settings in chronological order, or display of the input history in the menu format as the technique disclosed in the Japanese Unexamined Patent Application Publication No. 5-298377 is not sufficient to meet the user's needs which are subjected to change according to the operations performed at the time of job setting and elapsed time, as mentioned above. For example, when the recently executed jobs mainly consist of the jobs of simple setting, these jobs are displayed in the history list in the higher order of precedence (on a higher level). When a user wants to use the old job of complicated setting after the lapse of a predetermined time under this situation, the intended job is displayed in the history list in the lower order of precedence (on a lower level), and is difficult to find. Further, such a job may be erased due to limited memory capacity, and cannot be used in some cases.

The technique disclosed in the Japanese Unexamined Patent Application Publication No. 2005-25656 displays the menu screen wherein the last operation was performed in response to the user's last access. This menu screen is not always the optimum screen for the current setting. Further, since the structure is not designed to use the previous settings, setting operation must be performed independently of the menu screen displayed at the time of new access.

The object of the present invention is to solve the aforementioned problems and to provide an information processing apparatus and program wherein, when the job processing conditions are to be re-set using the previous settings, display can be made to meet the user's requirements, with sufficient consideration given to the operation items and elapsed time.

The essential points of the present invention intended to achieve the aforementioned object are found in the following inventions:

SUMMARY

One aspects of the present invention are any one of the image forming apparatus described as follows.

An information processing apparatus including:

an operation display section for displaying a screen to set processing conditions relating to a job and for receiving an operation to set the processing conditions relating to the job;

a generation section for generating a job under the processing conditions set by the operation with the operation display section;

a storage section for storing job information including the processing conditions relating to the job generated by the generation section;

a measuring section for measuring an elapsed time from a time when the job is generated by the generation section; and a control section which displays a plurality of previously generated jobs in a predetermined order using the job information on the operation display section, and replaces an order of the plurality of the jobs based on contents of the operation display section when the processing conditions is set and the elapsed time during displaying.

Another aspect of the present invention is a computer readable recording medium described as follows.

A computer readable recording medium storing a program which causes an information processing apparatus including an operation display section and a storage section, executes a method including:

displaying a screen to set a processing conditions relating to a job on the operation display section and receiving an operation to set the processing conditions relating to the job;

generating a job under the processing conditions set by the operation with the operation display section;

storing job information including the processing conditions of the generated job;

measuring an elapsed time from a time when the job is generated; and displaying a plurality of previously generated jobs in a predetermined order using the job information on the operation display section, and replacing an order of the plurality of the jobs, based on contents of the operation display section when the processing conditions is set and the lapsed time during displaying.

And another aspect of the present invention is An information processing method described as follows.

An information processing method employed by an information processing apparatus including an operation display section and a storage section, the information processing method including:

displaying the screen to set processing conditions of a job on the operation display section and receiving the operations;

generating a job under the processing conditions set by the operation of the operation display section;

storing the job information including the processing conditions of the generated job;

measuring an elapsed time from a time when the job is generated; and displaying a plurality of previously generated jobs in a predetermined order using the job information on the operation display section, and replacing an order of the plurality of the jobs, based on contents of the operation display section when the processing conditions is set and the lapsed time during displaying.

BRIEF DESCRIPTION OF THE DRAWINGS

FIG. 8(A) is an explanatory diagram showing the enlarged view of scan top screen in the operation screen of FIG. 7;

FIG. 8(B) is an explanatory diagram showing the enlarged view of direct input screen in the operation screen of FIG. 7;

FIG. 8(C) is an explanatory diagram showing the enlarged view of file transmission (SMB) screen in the operation screen of FIG. 7;

FIG. 9(D) is an explanatory diagram showing the enlarged view of host name screen in the operation screen of FIG. 7;

FIG. 9(E) is an explanatory diagram showing the enlarged view of file transmission (SMB) screen in the operation screen of FIG. 7;

FIG. 9(F) is an explanatory diagram showing the enlarged view of file path screen in the operation screen of FIG. 7;

FIG. 11(J) is an explanatory diagram showing the enlarged view of password screen in the operation screen of FIG. 7;

FIG. 11(K) is an explanatory diagram showing the enlarged view of file transmission (SMB) screen in the operation screen of FIG. 7;

FIG. 11(L) is an explanatory diagram showing the enlarged view of direct input screen in the operation screen of FIG. 7;

FIG. 13(P) is an explanatory diagram showing the enlarged view of file path screen in the operation screen of FIG. 7;

FIG. 13(Q) is an explanatory diagram showing the enlarged view of file transmission (SMB) screen in the operation screen of FIG. 7;

FIG. 13(R) is an explanatory diagram showing the enlarged view of user name screen in the operation screen of FIG. 7;

FIG. 14(S) is an explanatory diagram showing the enlarged view of password screen in the operation screen of FIG. 7;

FIG. 14(T) is an explanatory diagram showing the enlarged view of file transmission (SMB) screen in the operation screen of FIG. 7;

FIG. 14(U) is an explanatory diagram showing the enlarged view of direct input screen in the operation screen of FIG. 7;

FIG. 15 is a diagram representing an example of the configuration of a job history table;

FIG. 16 is an explanatory diagram showing the display screen for calculation of the correlation number displayed on the operation display section immediately after the latest job execution;

FIG. 17 is an explanatory diagram showing the display screen for calculation of the correlation number displayed on the operation display section 6 hours after the latest job execution;

FIG. 18 is a diagram representing an example of the result of calculating the correlation number;

FIG. 26 is a flow diagram showing the process of calculating the correlation number by the multi-functional peripheral in the embodiment of the present invention.

DESCRIPTION OF THE PREFERRED EMBODIMENT

Figure 1:
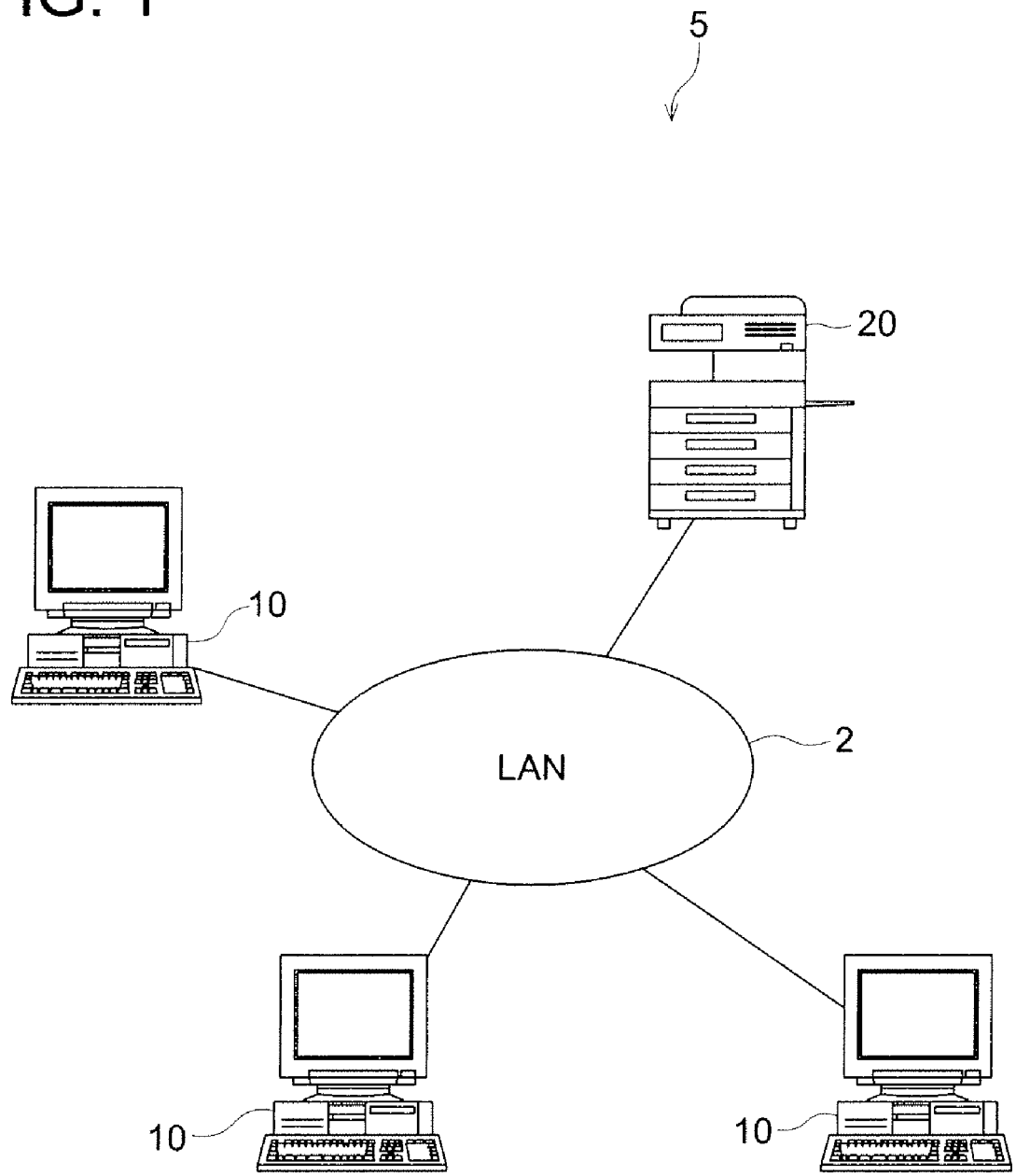
FIG. 1 is a block diagram showing the system configuration of the image forming system (information processing system) in the embodiment of the present invention.

The following describes the embodiments of the present invention with reference to drawings:

FIG. 1 shows an example of the system configuration of the image forming system (information processing system) 5 in the embodiment of the present invention. The image forming system 5 connects a desired number of terminals 10 and the multi-functional peripheral (MFP: Multi Function Peripheral/Multi Function Printer) 20 as an image forming apparatus (information processing apparatus) accessed from each terminal 10 via the network 2 such as LAN (Local Area Network). The multi-functional peripheral 20 is provided with a document copying function, printing function, scanning function, faxing function, boxing function, and file transfer function (SMB (Server Message Block) transfer function). The terminal 10 accesses the multi-functional peripheral 20 via the network 2, and requests various jobs such as a printing job and various operations to be executed. For example, the terminal 10 is made up of the driver program and others of the multi-functional peripheral 20 incorporated into a personal computer.

Figure 2:
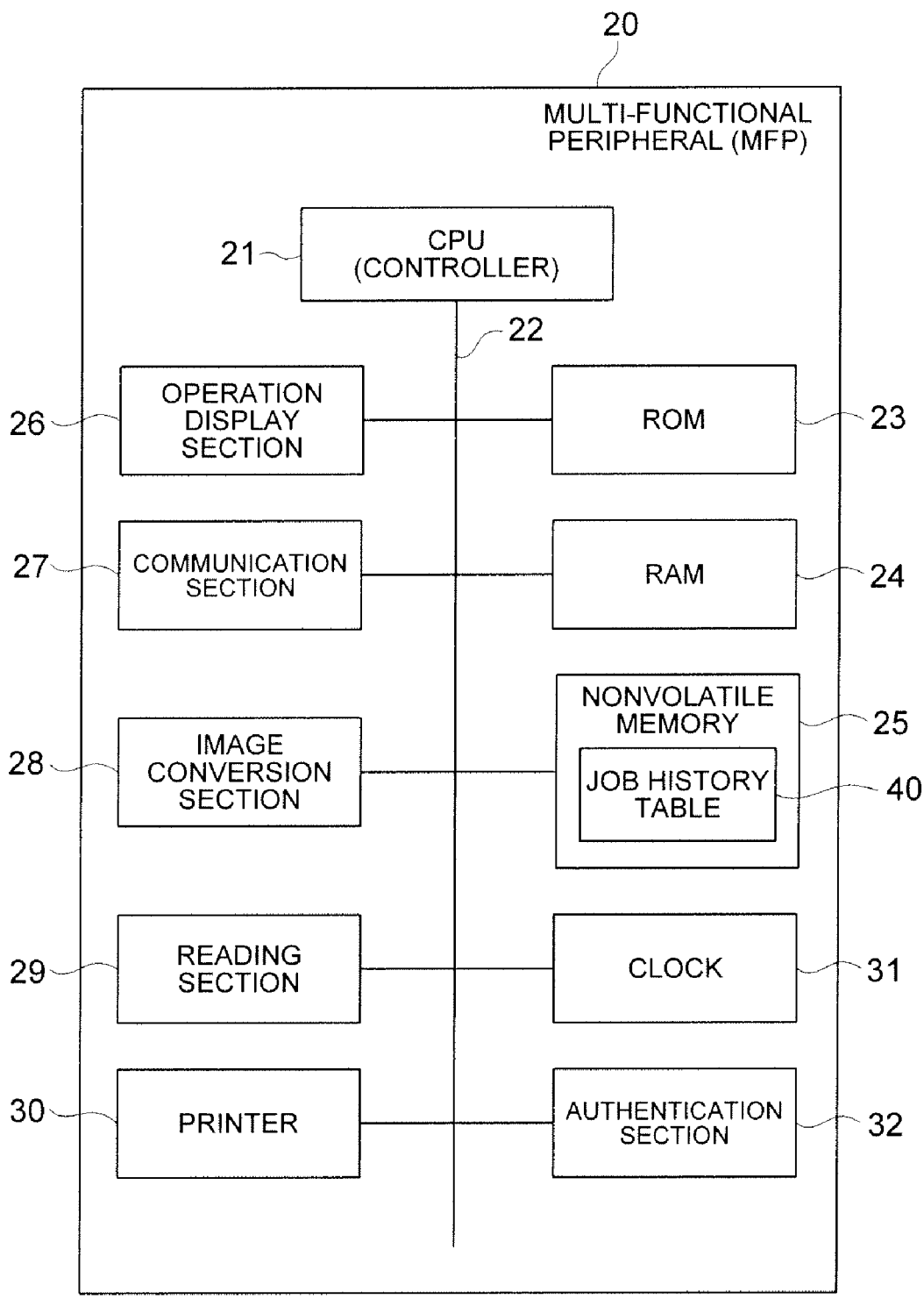
FIG. 2 is a block diagram showing the schematic structure of the multi-functional peripheral as an image forming apparatus (information processing apparatus) in the embodiment of the present invention.

FIG. 2 shows the schematic configuration of the multi-functional peripheral 20. The multi-functional peripheral 20 is composed of a CPU (Central Processing Unit) 21 as a controller which is connected with a ROM (Read Only Memory) 23, RAM (Random Access Memory) 24, nonvolatile memory 25, operation display section 26, communication section 27, image conversion section 28, reading section 29, printer 30, clock 31 and authentication section 32 via a bus 22.

The CPU 21 controls the operation of the multi-functional peripheral 20 in conformity to the program stored into the ROM 23. The RAM 24 is used as the work memory for temporarily storing various forms of data when a program is executed by the CPU 21. Further, the RAM 24 is also used as an image memory to store the image data. The nonvolatile memory 25 retains the memory even after the power source has been turned off. The nonvolatile memory 25 stores the job history table 40 (FIG. 15) to be described later, setting information (coefficient) used to calculate the correlation number, screen data displayed on the operation display section 26, transition table and user authentication information.

The operation display section 26 performs the functions of displaying various forms of operation screens and guide screens for a user, and receiving various forms of operations from the user. Here the operation display section 26 includes a liquid crystal display, touch panel mounted on the screen thereof, start key (execution key), history verification key, cancel key, end key and various types of switches. The communication section 27 performs the function of communicating with an external apparatus such as the terminal 10 via the network 2.

The reading section 29 optically reads a document and acquires image data. The reading section 29 is composed, for example, of a light source for illuminating a document, an image sensor for receiving light reflected from the document and reading one line of the document across the width, a scanning mechanism for moving the moving the position ready by the image sensor in units of line along the length of the document, and an optical path made up of lenses and mirrors for leading the light reflected from the document, to the image sensor. The image conversion section 28 applies various forms of image processing to image data, image processing including image correction, rotation, enlargement/reduction and compression/elongation.

The printer 30 prints out the image corresponding to the inputted image data on recording paper and outputs it. The printer 30 can be formed as a laser printer, for example, provided with a recording paper conveyance apparatus, photoreceptor drum, charging device, laser unit, development apparatus, transfer/separation apparatus, cleaning apparatus, and fixing apparatus, whereby an image is formed on recording paper by electrophotographic process.

The clock 31 ticks away the time. The authentication section 32 acquires the authentication data and authenticates a user based on the pre-registered authentication information. This user authentication is performed by various forms of general-purpose authentication techniques which are used independently or in combination. Such techniques include the card authentication technique wherein personal authentication is performed, for example, by reading the authentication data stored in the IC (Integrated Circuit) card or ID (Identification) card and checking it against the pre-registered authentication information; and the biological authentication technique wherein personal authentication is performed by reading the biological information such as fingerprints and finger vein as authentication data and checking it against the pre-registered authentication information.

The CPU 21 serves the functions of a generation device for executing the program to generate a job under the processing conditions set by the operation on the operation display section 26; a measuring device for measuring the time elapsed from the generation of a job by obtaining time information from the clock 31; and a control device for displaying on the operation display section 26 the operation screen for setting the job processing conditions, and the history of the job having been executed. Further, the CPU 21 also serves the function of calculating the correlation number to be described later for the purpose of replacing the order of a plurality of jobs in history display.

The following describes the job setting operation and the history display of the previously set/executed jobs in the multi-functional peripheral 20:

The multi-functional peripheral 20 has a plurality of types of modes such as copying mode, scanning mode and file transfer mode. Each mode is provided with a plurality of functions (alternatives). To permit setting of the jobs in a great number of variations based on these types of modes and functions, the multi-functional peripheral 20 is provided with a plurality of operation screens, which are displayed by selecting the operation display section 26.

The operation screen displayed on the operation display section 26 displays the buttons and icons for changing the screens, selecting and setting the job processing conditions and various forms of modes and functions. In response to the pressing of the buttons and icons on the operation screen, the multi-functional peripheral 20 changes the screens and sets the jobs.

Further, to improve the maneuverability of setting the jobs formed in a great number of variations i.e., to ensure that the user performs job setting operations easily and effectively when many functions are frequently used, the multi-functional peripheral 20 is equipped with a plurality of hierarchical levels of operations. For example, when the user wants to perform the settings wherein the same modes or functions are associated, or to perform the settings under detailed processing conditions, the screens are changed and the operations proceed in the hierarchical direction at the same time so that the user can easily the direction in which the operations should proceed in order to perform desired settings, or the context of the current operations.

The aforementioned change of the screens is performed with reference to the screen data stored in the nonvolatile memory 25 and the screen change table (tree diagram).

Further, in response to the operation of pressing the history verification key (not illustrated), the multi-functional peripheral 20 displays the history of the previously set/executed jobs on the operation display section 26 in a predetermined order.

In the job setting process, the operation screens are changed. In some cases, the change of operation screens is accompanied by the change of the hierarchical levels of operation, whereby the positions to be set are reached. The job setting processes—the number of hierarchical levels of operations, number of settings and the number of screen changes, to put it more specifically—vary according to the processing conditions of the job to be set. In the multi-functional peripheral 20, more complicated operation items—i.e., the operations items having a greater number of hierarchical levels of operations, a greater number of settings and a greater number of screen changes—are assigned with a higher order of importance. Less complicated operation items—i.e., the operations items having a smaller number of hierarchical levels of operations, a smaller number of settings and a smaller number of screen changes—are assigned with a lower order of importance. Further, when a job history is displayed in the multi-functional peripheral 20, with the passage of time from job generation, the jobs in the lower order of importance (less complicated operation items) are assigned with substantially reduced display priority, as compared with the jobs in the higher order of importance. Thus, and the jobs in the higher order of importance are displayed on a higher level (more preferentially) than the jobs in the lower order of importance. The following describes the relationship between the operation items and maneuverability, and the order of importance:

1. Relationship between the number of hierarchical levels of operations and maneuverability The deeper the hierarchical level of operation, the more complicated the operation . . . . "Higher" order of importance ⇒ More preferential display or higher order of display The shallower the hierarchical level of operation, the easier the operation . . . . "Lower" order of importance 2. Relationship between the number of settings and maneuverability The greater the number of settings, the more difficult the operation . . . . "Higher" order of importance ⇒ More preferential display or higher order of display The less the number of settings, the easier the operation . . . . "Lower" order of importance 3. Relationship between the number of screen changes and maneuverability The greater the number of screen changes, the more difficult the operation . . . . "Higher" order of importance ⇒ More preferential display or higher order of display The less the number of screen changes, the easier the operation . . . . "Lower" order of importance With reference to specific examples, the following describes the details of the operation items when a job is set on the operation display section 26—i.e., the hierarchical level of operation (layer), setting (setup) and screen change (operation panel transition).

FIG. 3 through FIG. 7 provide a schematic representation (tree structure) of the changes of the operation screens displayed on the operation display section 26 in the process of setting the copying job or file transfer (SMB transmission) job.

This example has four operation hierarchical levels (L1 through L4) ranging from the first hierarchical level as the top level to the fourth hierarchical level as the bottom level. In the normal state immediately after start of the multi-functional peripheral 20, the top screen (initial screen) provided on the first hierarchical level L1 is displayed on the operation display section 26. The operations (pressing of the button) on the operation screen displayed on the operation display section 26 includes (1) screen switching operation, (2) job setting (job generation) operation, and (3) operation related to both of them (i.e., simultaneous job setting and screen change). In this example, only the operations (2) and (3) are counted as the number of settings.

In this example, the user X of the multi-functional peripheral 20 undergoes user authentication at desired time points, and performs the setting of five types of jobs.

Figure 3:
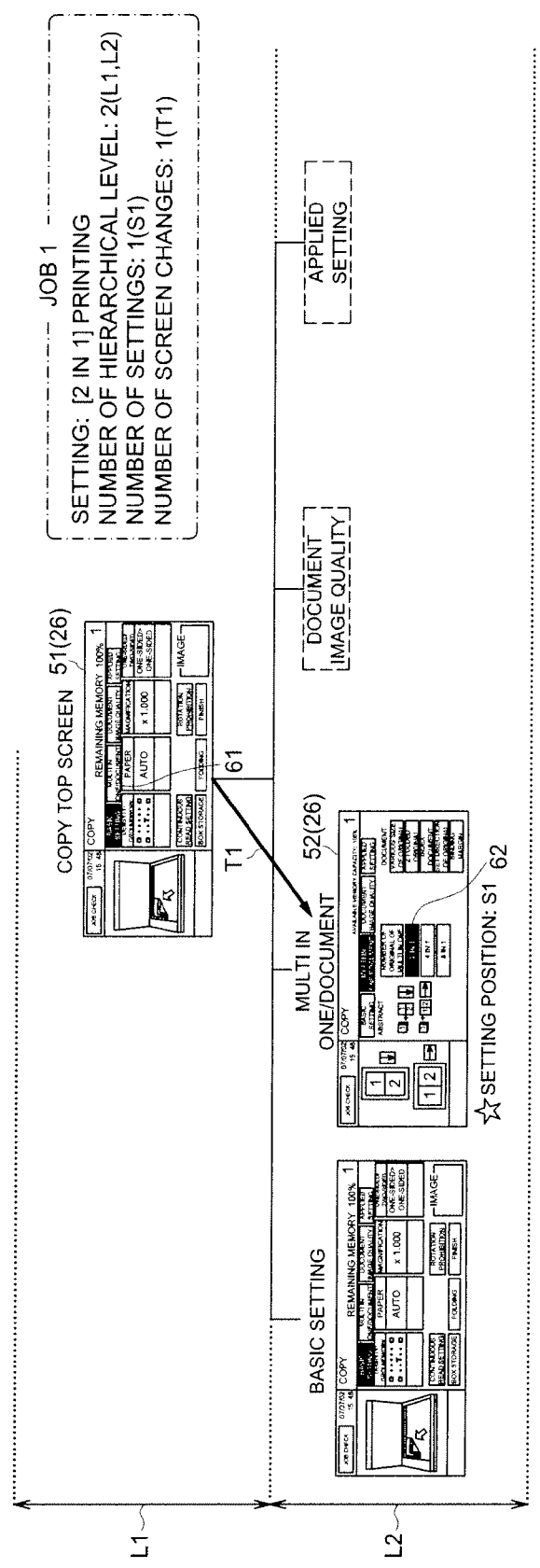
FIG. 3 is an explanatory diagram showing the changes of operation screens displayed on the operation display section in the process of setting the [2 in 1] printing job.

FIG. 3 shows the operation screen, hierarchical level of operation and setting position in the process of setting the first job. The setting of the first job is related to the [2 in 1] printing.

When the MULTI IN ONE/Document button 61 displayed on the copy top screen 51 of the first hierarchical level L1 has been pressed, the CPU 21 switches the display on the operation display section 26 over to the MULTI IN ONE/document screen 52 provided on the second hierarchical level L2 (screen change: arrow mark T1). When the 2 in 1 button 62 displayed on the MULTI IN ONE/Document screen 52 has been pressed, the CPU 21 sets the [2 in 1] (setting position: S1).

The message "You can take a copy." appears on the MULTI IN ONE/Document screen 52. The multi-functional peripheral 20 is ready to take a copy. When the Start key (not illustrated) is pressed, the CPU 21 verifies the details of the settings, and generates and executes the [2 in 1] printing job. The operation items in this case include two hierarchical levels, one settings and one screen change.

Figure 4:
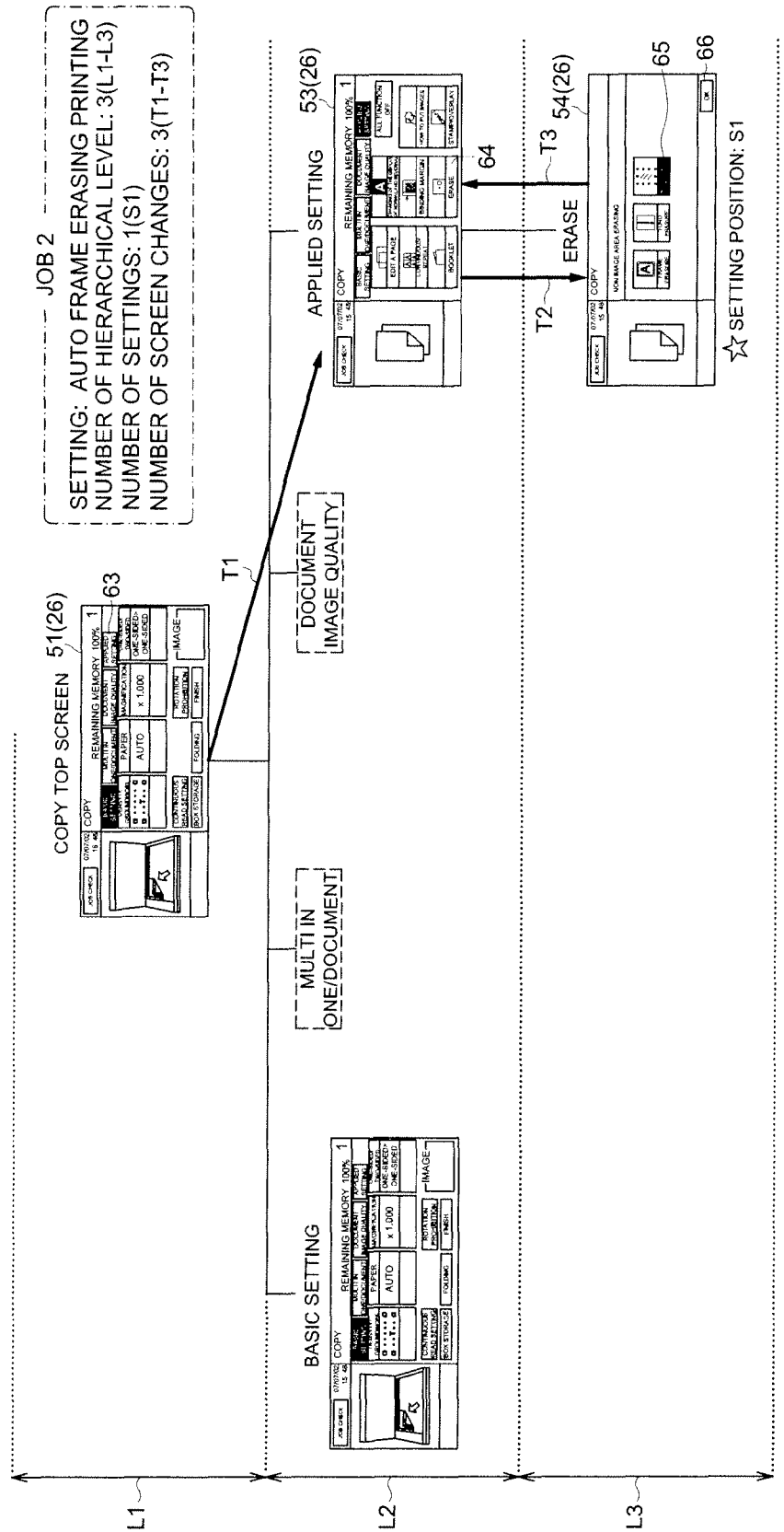
FIG. 4 is an explanatory diagram showing the changes of the operation screens displayed on the operation display section in the process of setting the [NON IMAGE AREA ERASING] printing job.

FIG. 4 shows the operation screen, hierarchical level of operation and setting position in the process of setting the second job. The second job setting item includes the [NON IMAGE AREA ERASING] printing.

When the applied setting button 63 displayed on the copy top screen 51 of the first hierarchical level L1 has been pressed, the CPU 21 switches the display of the operation display section 26 to the applied setting screen 53 on the second hierarchical level L2 (screen change: arrow mark T1). If the erasure button 64 displayed on the applied setting screen 53 has been pressed, the CPU 21 switches the display of the operation display section 26 over to the erasure screen 54 on the third hierarchical level L3 (screen change: arrow mark T2).

When the NON IMAGE AREA ERASE button 65 displayed on the erasure screen 54, the CPU 21 sets the [NON IMAGE AREA ERASING] (setting position: S1). If the OK button 66 has been pressed, the CPU 21 switches the display of the operation display section 26 over to the applied setting screen 53 on the second hierarchical level L2 (screen change: arrow mark T3).

The message "You can take a copy." appears on the applied setting screen 53. The multi-functional peripheral 20 is ready to take a copy. When the Start key is pressed, the CPU 21 verifies the details of the settings, and generates and executes the [NON IMAGE AREA ERASING] printing job. The operation items in this case include three hierarchical levels, one settings and three screen changes.

Figure 5:
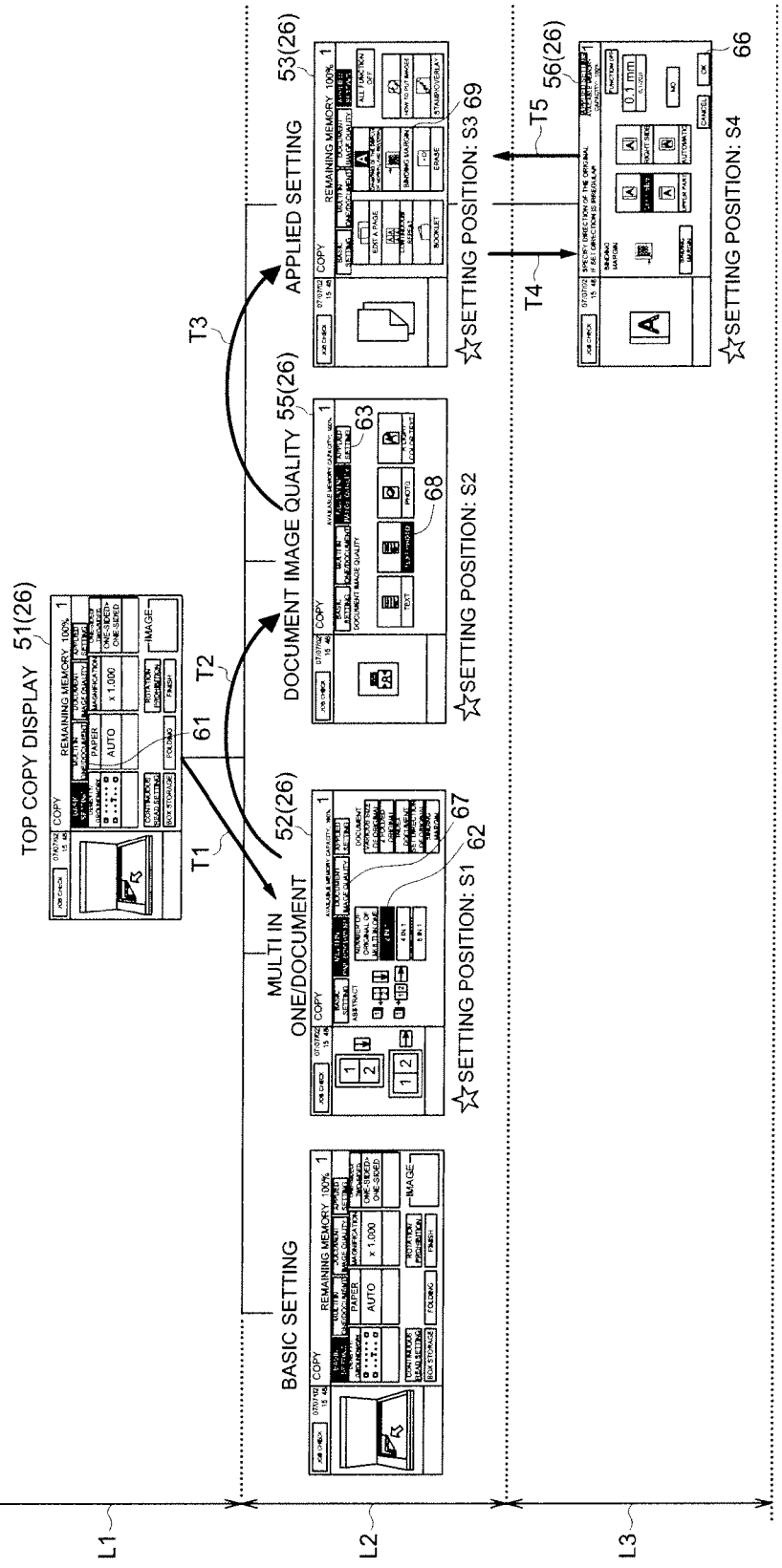
FIG. 5 is an explanatory diagram showing the changes of the operation screens displayed on the operation display section in the process of setting the [2 in 1] [text/photo] [binding margin] printing job.

FIG. 5 shows the operation screen, hierarchical level of operation and setting position in the process of setting the third job. The setting of the third job is related to the [2 in 1] [text/photo] [binding margin] printing.

In response to the same operation as that in the first job, the CPU 21 sets the [2 in 1] (screen change: arrow mark T1/setting position: S1). After that, when the document image quality button 67 has been pressed, the CPU 21 switches the display of the operation display section 26 over to the document image quality screen 55 (screen change: arrow mark T2) on the same second hierarchical level L2 as that of the MULTI IN ONE/document screen 52. When the text/photo button 68 displayed on the document image quality screen 55 has been pressed, the CPU 21 sets the [text/photo] (setting position: S2).

When the applied setting button 63 has been pressed, the CPU 21 switches the display of the operation display section 26 over to the applied setting screen 53 on the same second hierarchical level L2 (screen change: arrow mark T3) When the binding margin button 69 (shown as "binding margin" in the drawing) displayed on the applied setting screen 53 has been pressed (setting position: S3), the CPU 21 switches the display of the operation display section 26 over to the binding margin creation screen 56 on the third hierarchical level L3 (shown as "binding margin CREATE" in the drawing) (screen change: arrow mark T4).

In response to the setting of the binding margin position and volume on the binding margin creation screen 56, the CPU 21 sets the [binding margin] when the OK button 66 has been pressed (setting position: S4), and switches the display of the operation display section 26 over to the applied setting screen 53 on the second hierarchical level L2 (screen change: arrow mark T5).

The message "You can take a copy." appears on the applied setting screen 53. The multi-functional peripheral 20 is ready to take a copy. When the Start key is pressed, the CPU 21 verifies the details of the settings, and generates and executes the [2 in 1] [text/photo] [binding margin] printing job. The operation items in this case include three hierarchical levels, four settings and five screen changes.

Figure 6:
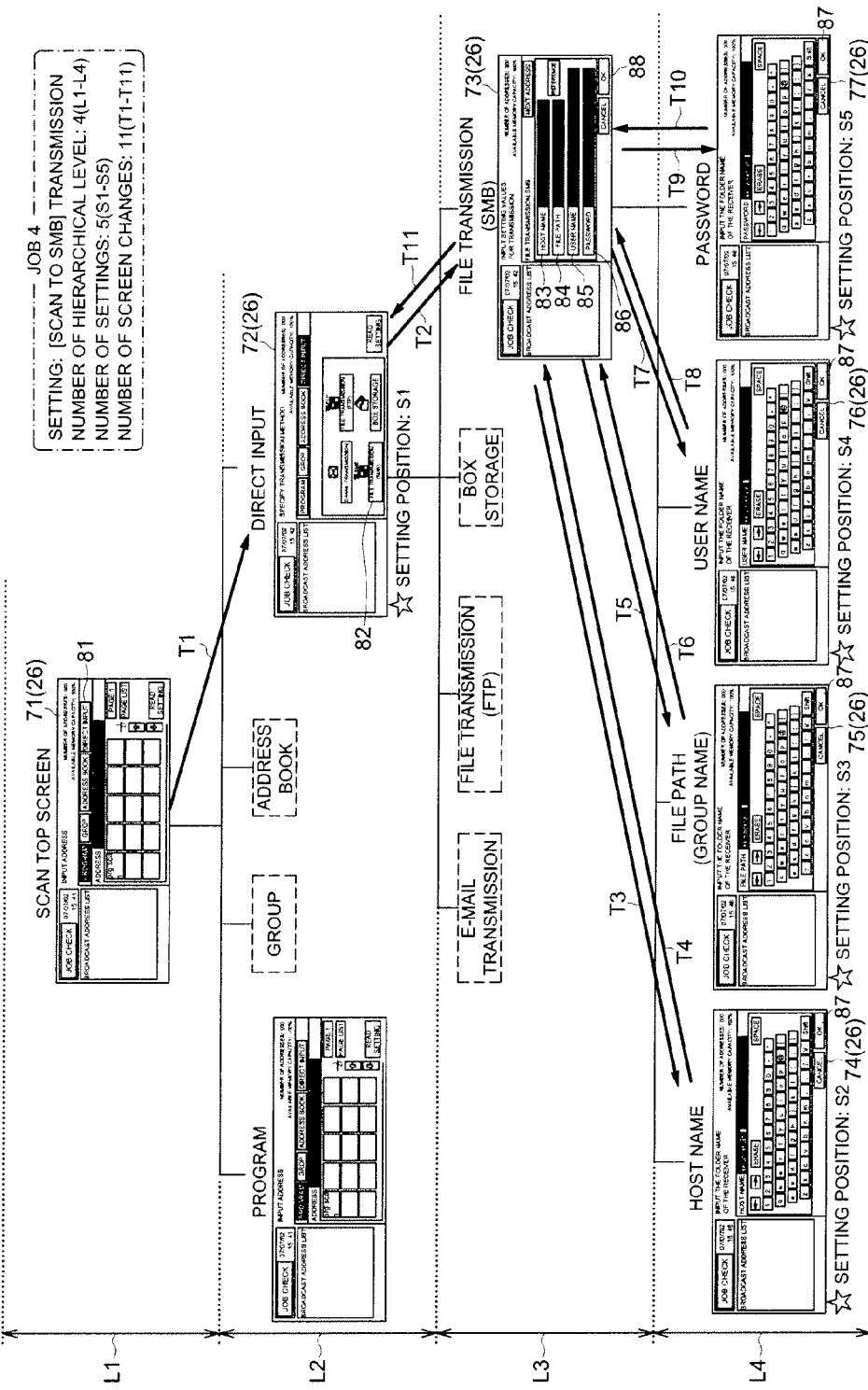
FIG. 6 is an explanatory diagram showing the changes of the operation screens displayed on the operation display section in the process of setting the [Scan to SMB] transmission job.

FIG. 6 shows the operation screen, hierarchical level of operation and setting position in the process for setting the fourth job. The setting of the fourth job is related to the [Scan to SMB] transmission.

When the direct input button 81 displayed on the scan top screen 71 of the first hierarchical level L1 has been pressed, the CPU 21 switches the display of the operation display section 26 over to the direct input screen 72 on the second hierarchical level L2 (screen change: arrow mark T1) When the file transmission (SMB) button 82 displayed on the direct input screen 72 has been pressed, (setting position: S1), the CPU 21 switches the display of the operation display section 26 over to the file transmission (SMB) screen 73 on the third hierarchical level L3 (screen change: arrow mark T2).

When the host name button 83 displayed on the file transmission (SMB) screen 73 has been pressed, the CPU 21 switches the display of the operation display section 26 over to the host name screen 74 on the fourth hierarchical level L4 (screen change: arrow mark T3). When the OK button 87 has been pressed on the host name screen 74 in response to the input of the host name (IP address) of the destination, the CPU 21 sets the host name (setting position: S2), and switches the display of the operation display section 26 over to the file transmission (SMB) screen 73 of the third hierarchical level L3 (screen change: arrow mark T4).

When the file path button 84 displayed on the file transmission (SMB) screen 73 has been pressed, the CPU 21 switches the display of the operation display section 26 over to the file path (group name) screen 75 on the fourth hierarchical level L4 (screen change: arrow mark T5). When the OK button 87 has been pressed on the file path screen 75 in response to the input of the file path (group name) of the destination, the CPU 21 sets the file path (group name) (setting position: S3), and switches the display of the operation display section 26 over to the file transmission (SMB) screen 73 of the third hierarchical level L3 (screen change: arrow mark T6).

When the user name button 85 displayed on the file transmission (SMB) screen 73 has been pressed, the CPU 21 switches the display of the operation display section 26 over to the user name screen 76 of the fourth hierarchical level L4 (screen change: arrow mark T7). When the OK button 87 has been pressed on the user name screen 76 in response to the input of the user name on the destination, the CPU 21 sets the user name (setting position: S4), and switches the display of the operation display section 26 over to the file transmission (SMB) screen 73 of the third hierarchical level L3 (screen change: arrow mark T8).

When the password button 86 displayed on the file transmission (SMB) screen 73 has been pressed, the CPU 21 switches the display of the operation display section 26 over to the password screen 77 on the fourth hierarchical level L4 (screen change: arrow mark T9). When the OK button 87 has been pressed on the password screen 77 in response to the input of the password set on the destination, the CPU 21 sets the password (setting position: S5), and switches the display of the operation display section 26 over to the file transmission (SMB) screen 73 on the third hierarchical level L3 (screen change: arrow mark T10).

When the OK button 88 on the file transmission (SMB) screen 73 has been pressed, the CPU 21 switches the display of the operation display section 26 over to the direct input screen 72 of the second hierarchical level L2 (screen change: arrow mark T11). When the Start key has been pressed, the CPU 21 verifies the details of the setting and generates and executes the [Scan to SMB] transmission job. In this case, the operation items include four hierarchical levels, five settings and 11 screen changes.

Figure 7:
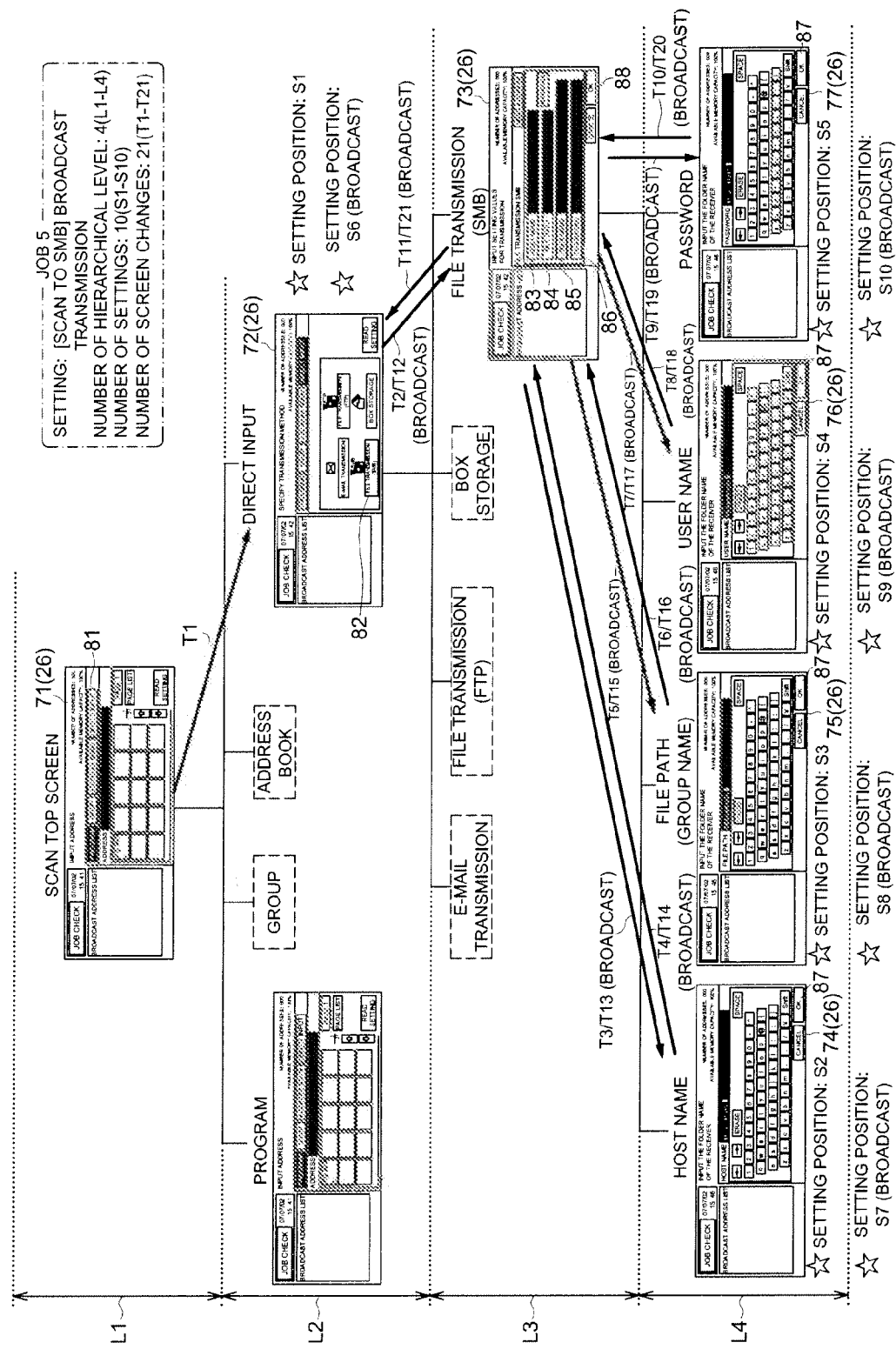
FIG. 7 is an explanatory diagram showing the changes of the operation screens displayed on the operation display section in the process of setting the [Scan to SMB] broadcast transmission job.
Figure 10:
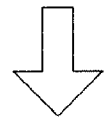
FIG. 10(G) is an explanatory diagram showing the enlarged view of file transmission (SMB) screen in the operation screen of FIG. 7.
FIG. 10(H) is an explanatory diagram showing the enlarged view of user name screen in the operation screen of FIG. 7.
FIG. 10(I) is an explanatory diagram showing the enlarged view of file transmission (SMB) screen in the operation screen of FIG. 7.
Figure 10:
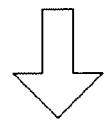
Figure 10:
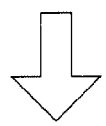

FIG. 7 shows the operation screen, hierarchical level of operation and setting position in the process of setting the fifth job. FIG. 8 through FIG. 14 show an enlarged view of each operation screen of FIG. 7. The setting items of the fifth job include the [Scan to SMB] broadcast transmission.

The [Scan to SMB] broadcast transmission of the fifth job sets the information of destination of the file transmission (host name, file path (group name), user name and password) having been described with reference to the [Scan to SMB] transmission of the fourth job, for the a plurality of destination of the file transmission (broadcasting address) to which broadcast transmission is to be made. Except for the aforementioned procedure, the same operations items as those of the [Scan to SMB] transmission of the fourth job are set. The following describes the operation items for setting the [Scan to SMB] broadcast transmission in conformity to the flow of the operation screens of FIG. 8 through FIG. 14:

FIG. 8(A) shows an enlarged view of the scan top screen 71 on the first hierarchical level L1 of FIG. 7. When the direct input button 81 of the scan top screen 71 has been pressed, the CPU 21 switches the display of the operation display section 26 over to the direct input screen 72 of FIG. 8(B) (direct input screen 72 of the second hierarchical level L2 of FIG. 7/screen change: arrow mark T1). When the file transmission (SMB) button 82 of the direct input screen 72 has been pressed (setting position: S1 in FIG. 7), the CPU 21 switches the display of the operation display section 26 over to the file transmission (SMB) screen 73 of FIG. 8(C) (file transmission (SMB) screen 73 of the third hierarchical level L3 of FIG. 7/screen change: arrow mark T2).

When the host name button 83 of the file transmission (SMB) screen 73 has been pressed, the CPU 21 switches the display of the operation display section 26 over to the host name screen 74 of FIG. 9(D) (the host name screen 74 of the fourth hierarchical level L4 of FIG. 7/screen change: arrow mark T3). When the OK button 87 has been pressed on the host name screen 74 in response to the input of the host name (IP address) on the destination, the CPU 21 sets the host name (setting position: S2 in FIG. 2), and switches the display of the operation display section 26 over to the file transmission (SMB) screen 73 of FIG. 9(E) (file transmission (SMB) screen 73 of the third hierarchical level L3 of FIG. 7/screen change: arrow mark T4).

When the file path button 84 of the file transmission (SMB) screen 73 has been pressed, the CPU 21 switches the display of the operation display section 26 over to the file path screen 75 of FIG. 9(F) (file path screen 75 of the fourth hierarchical level L4 of FIG. 7/screen change: arrow mark T5). When the OK button 87 has been pressed on the file path screen 75 in response to the input of the file path on the destination, the CPU 21 sets the file path (setting position: S3 in FIG. 7), and switches the display of the operation display section 26 over to the file transmission (SMB) screen 73 of FIG. 10(G) (file transmission (SMB) screen 73 of the third hierarchical level L3 of FIG. 7/screen change: arrow mark T6).

When the user name button 85 on the file transmission (SMB) screen 73 has been pressed, the CPU 21 switches the display of the operation display section 26 over to the user name screen 76 of FIG. 10(H) (user name screen 76 of the fourth hierarchical level L4 of FIG. 7/screen change: arrow mark T7). When the OK button 87 has been pressed on the user name screen 76 in response to the input of the user name on the destination, the CPU 21 sets the user name (setting position: S4 in FIG. 7), and switches the display of the operation display section 26 over to the file transmission (SMB) screen 73 of FIG. 10(I) (file transmission (SMB) screen 73 of the third hierarchical level L3 of FIG. 7/screen change: arrow mark T8).

Figure 11J:
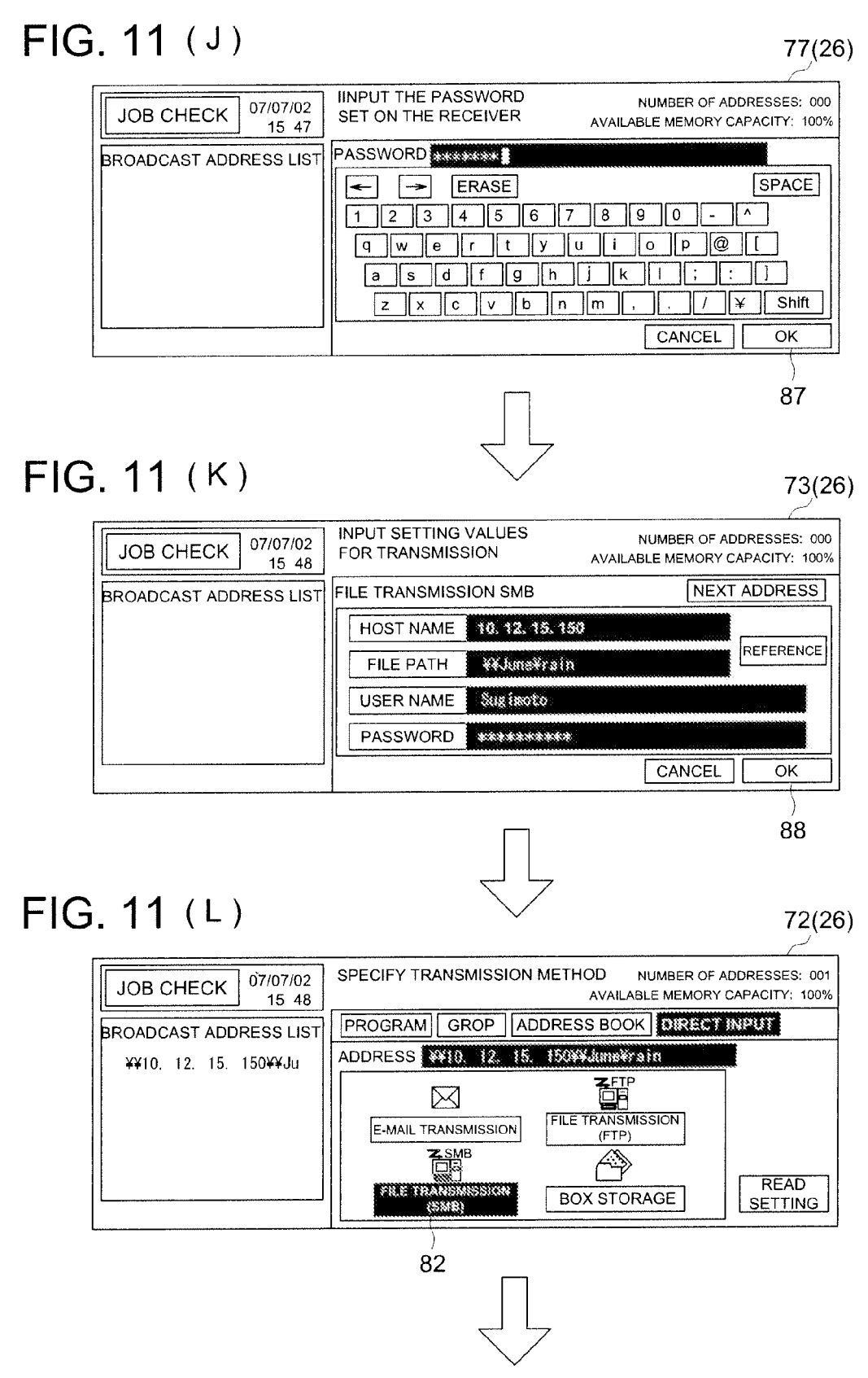

When the password button 86 of the file transmission (SMB) screen 73 has been pressed, the CPU 21 switches the display of the operation display section 26 over to the password screen 7 of FIG. 11(J) (password screen 77 of the fourth hierarchical level L4 of FIG. 7/screen change: arrow mark T9). When the OK button 87 has been pressed on the password screen 77 in response to the input of the password set on the destination, the CPU 21 sets the password (setting position: S5 in FIG. 7), and switches the display of the operation display section 26 over to the file transmission (SMB) screen 73 of FIG. 11(K) (file transmission (SMB) screen 73 of the third hierarchical level L3 of FIG. 7/screen change: arrow mark T10).

When the OK button 88 on the file transmission (SMB) screen 73 has been pressed, the CPU 21 verifies the contents of the information set on the destination of the file transmission of the first user, and switches the display of the operation display section 26 over to the direct input screen 72 of FIG. 11(L) (direct input screen 72 of the second hierarchical level L2 of FIG. 7/screen change: arrow mark T11). In this case, information on the destination of the file transmission of the first user having been set this time appears in the "broadcast address list" on the direct input screen 72.

When the file transmission (SMB) button 82 of the direct input screen 72 has been pressed again (setting position: S6), the CPU 21 switches the display of the operation display section 26 over to the file transmission (SMB) screen 73 of FIG. 12(M) (file transmission (SMB) screen 73 of the third hierarchical level L3 of FIG. 7/screen change: arrow mark T12), so that the system is ready to receive the setting of the information on the destination of the file transmission of the second user. After that, information on the destination of the file transmission (broadcast address) of the second user can be set using the same operation procedure as that of the first user.

Figure 12:
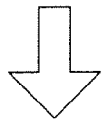
FIG. 12(M) is an explanatory diagram showing the enlarged view of file transmission (SMB) screen in the operation screen of FIG. 7.
FIG. 12(N) is an explanatory diagram showing the enlarged view of host name screen in the operation screen of FIG. 7.
FIG. 12(O) is an explanatory diagram showing the enlarged view of file transmission (SMB) screen in the operation screen of FIG. 7.
Figure 12:
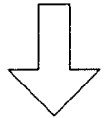
Figure 12:
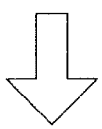

To be more specific, when the host name button 83 of the file transmission (SMB) screen 73 has been pressed, the CPU 21 switches the display of the operation display section 26 over to the host name screen 74 of FIG. 12(N) (host name screen 74 of the fourth hierarchical level L4 of FIG. 7/screen change: arrow mark T13). When the OK button 87 has been pressed on the host name screen 74 in response to the input of the host name (IP address) on the destination, the CPU 21 sets the host name (setting position: S7 in FIG. 7), and switches the display of the operation display section 26 over to the file transmission (SMB) screen 73 of FIG. 12(0) (file transmission (SMB) screen 73 of the third hierarchical level L3 of FIG. 7/screen change: arrow mark T14)

When the file path button 84 of the file transmission (SMB) screen 73 has been pressed, the CPU 21 switches the display of the operation display section 26 over to the file path screen 75 of FIG. 13(P) (file path screen 75 of the fourth hierarchical level L4 of FIG. 7/screen change: arrow mark T15). When the OK button 87 has been pressed on the file path screen 75 in response to the input of the file path on the destination, the CPU 21 sets the file path (setting position: S8 in FIG. 7), and switches the display of the operation display section 26 over to the file transmission (SMB) screen 73 of FIG. 13(Q) (file transmission (SMB) screen 73 of the third hierarchical level L3 of FIG. 7/screen change: arrow mark T16).

When the user name button 85 of the file transmission (SMB) screen 73 has been pressed, the CPU 21 switches the display of the operation display section 26 over to the user name screen 76 of FIG. 13(R) (user name screen 76 of the fourth hierarchical level L4 of FIG. 7/screen change: arrow mark T17). When the OK button 87 has been pressed on the user name screen 76 in response to the input of the user name on the destination, the CPU 21 sets the user name (setting position: S9 in FIG. 7), and switches the display of the operation display section 26 over to the file transmission (SMB) screen 73 (file transmission (SMB) screen 73 of the third hierarchical level L3 of FIG. 7/screen change: arrow mark T18).

Figures 14S, 14T, 14U:
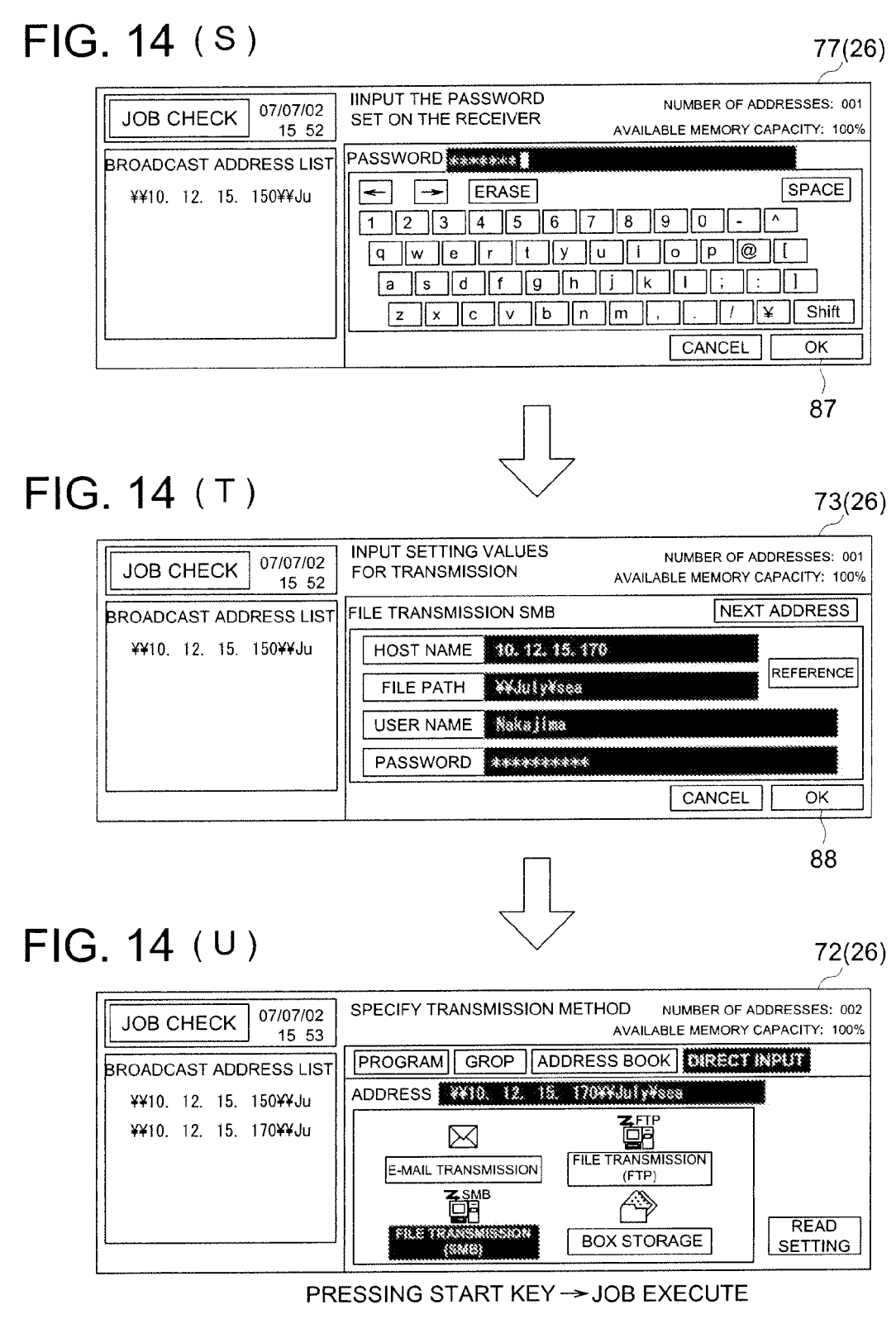

When the password button 86 of the file transmission (SMB) screen 73 has been pressed, the CPU 21 switches the display of the operation display section 26 over to the password screen 77 of FIG. 14(S) (password screen 77 of the fourth hierarchical level L4 of FIG. 7/screen change: arrow mark T19). When the OK button 87 has been pressed on the password screen 77 in response to the input of the password set on the destination, the CPU 21 sets the password (setting position: S10 in FIG. 7), and switches the display of the operation display section 26 over to the file transmission (SMB) screen 73 of FIG. 14(T) (file transmission (SMB) screen 73 of the third hierarchical level L3 of FIG. 7/screen change: arrow mark T20).

When the OK button 88 of the file transmission (SMB) screen 73 has been pressed, the CPU 21 switches the display of the operation display section 26 over to the direct input screen 72 of the second hierarchical level L2 of FIG. 14(U) (screen change: arrow mark T21). Further, when a destination of the file transmission (broadcast address) is present, information on the destination of the file transmission for the third and later users can be set by the same operation. When the Start key has been pressed, the CPU 21 verifies the settings, and generates and executes [Scan to SMB] broadcast transmission job. When there are two of these broadcast addresses, the operation items include four hierarchical levels, ten settings and 21 screen changes.

FIG. 15 shows an example of the structure of the job history table 40 stored in the nonvolatile memory 25 by the settings of the aforementioned five jobs.

The job history table 40 registers the information for displaying the job history. It registers the job execution order data, execution time point (date and time) data, setting description data and operation description data in the form associated with one another. Further, when the user is specified by user authentication, the user name data is also registered in the associated form.

The execution time point (date and time) data has been obtained by the CPU 21 from the clock 31 at the time of job execution. The job execution order data indicates serial numbers automatically assigned by the CPU 21 sequentially starting from the job having the latest execution time point. The serial numbers are exemplified by 1 through N starting from 1. The setting description data indicates the job settings (processing conditions) determined by the user. The operation description data represents the details of the operations performed by the user for job setting. To put it in greater details, this data includes the number-of-hierarchical-levels data showing the number of hierarchical levels of operations in the job setting operation, number-of-settings data showing the number of settings in job setting operation, and the number-of-screen-changes data representing the number of screen changes in the job setting operation. The user name data indicates the name of the user having set the job and is exemplified by the user name registered in the form associated with the authentication information.

The execution time points (date and time) of the aforementioned five jobs are, for example, 17:00, Jun. 25, 2007 for the fifth job, 14:00, Jun. 26, 2007 for the fourth job, 17:00, Jun. 26, 2007 for the third job, 11:00, Jun. 27, 2007 for the second job, and 13:00, Jun. 27, 2007 for the first job. Thus, the job history table 40 includes the registrations of the jobs from 1 through 5 according to the order of execution, wherein these jobs are arranged sequentially from the first through five jobs, starting from the first job having the latest execution time point (date and time). When the time of execution of the first job is assumed as the reference, the second job was executed two hours before the first job, the third job was executed 20 hours before the first job, the fourth job was executed 23 hours before the first job, and the fifth job was executed 44 hours before the first job.

The history of a plurality of previously executed (generated) jobs is displayed in a predetermined order on the operation display section 26 using the information registered in the job history table 40. Further, the order of the jobs whose history is display is changed based on the operation items at the time of job setting and the time elapsed from the time of job execution.

A change in the order of the jobs having the history thereof displayed is performed in conformity to the order of magnitude of correlation numbers by calculating these correlation numbers for each job, based on the aforementioned operation items and the elapsed time.

FIG. 16 and FIG. 17 show the display screen for calculating the correlation numbers. To put it in greater details, FIG. 16 shows the correlation number calculation display screen 100 displayed at 13:00, Jun. 27, 2007 immediately after execution of [2 in 1] printing job as the first and latest job. FIG. 17 shows the correlation number calculation display screen 101 displayed at 19:00, Jun. 27, 2007 six hours after execution of the latest job. These correlation number calculation display screens 100 and 101 are displayed, for example, on the operation display section 26 in response to a predetermined operation on the operation display section 26.

The correlation number calculation display screens 100 and 101 indicate the order of job execution, job name (job setting item), correlation number calculation parameter and correlation number. The parameters selected freely by the user to calculate the correlation number include those for the number of hierarchical levels, number of settings and the number of screen changes. The parameter for elapsed time is provided as the essential parameter.

The parameters for the number of hierarchical levels, number of settings and the number of screen changes that are selected freely can be separately selected or cancelled, for example, by a predetermined operation on the operation display section 26. The elapsed time provided as an essential parameter denotes the duration of time elapsed from the time of job execution to the current time point when this display screen appears. For example, the correlation number calculation display screen 100 of FIG. 16, is displayed immediately after execution of the [2 in 1] printing job as the first job. Thus, the elapsed time is "0" for first job, "2" for the second job having been executed two hours before the first job, "20"

for the third job having been executed 20 hours before the first job, "23" for the fourth job having been executed 23 hours before the first job, and "44" for the fourth job having been executed 44 hours before the first job. The correlation number calculation display screen 101 of FIG. 17 appears 6 hours after execution of the [2 in 1] printing job as the first job. Thus, the elapsed time displayed is "6" for the first job. For second through fifth jobs, the values obtained by adding "6" to the values shown on the screen 100 of FIG. 16 are displayed as the elapsed times, respectively. In this display screen, for the sake of expediency, the correlation numbers are shown as "A" for the first job, "B" for the second job, "C" for the third job, "D" for the fourth job, and "E" for the fifth job.

The following describes the method of calculating the correlation number: The correlation number is calculated according to the operation items and elapsed time. In this embodiment, the elapsed time is divided by the weight determining coefficient with reference to time axis and the logarithm of this number is obtained. This is further divided by the setting-related coefficient that denotes the degree of complexity of the operation items (the number of hierarchical levels, number of settings and the number of screen changes). To put it more specifically, assuming that the correlation number is "z", weight determining coefficient with respect to time axis is "y", and the setting-related coefficient is "x", the following Formula (1) is used to calculate "z":

$$z = \log((\text{the elapsed time}+1)/y)/x \qquad \text{Formula (1)}$$

The "+1" for the elapsed time in Formula (1) is a coefficient provided to avoid log 0. The weight determining coefficient "y" with respect to time axis can be set by the user and is stored in the nonvolatile memory 25. Further, the setting-related coefficient "x" can be calculated using the following Formula (2):

$$x = (\text{number of hierarchical levels}*\alpha)+(\text{number of settings}*\beta)+(\text{number of screen changes}*\gamma) \qquad \text{Formula (2)}$$

"$\alpha$", "$\beta$" and "$\gamma$" of Formula (2) indicate weight determining coefficients. These weight determining coefficients can be set by the user and are stored in the nonvolatile memory 25.

Figure 19:
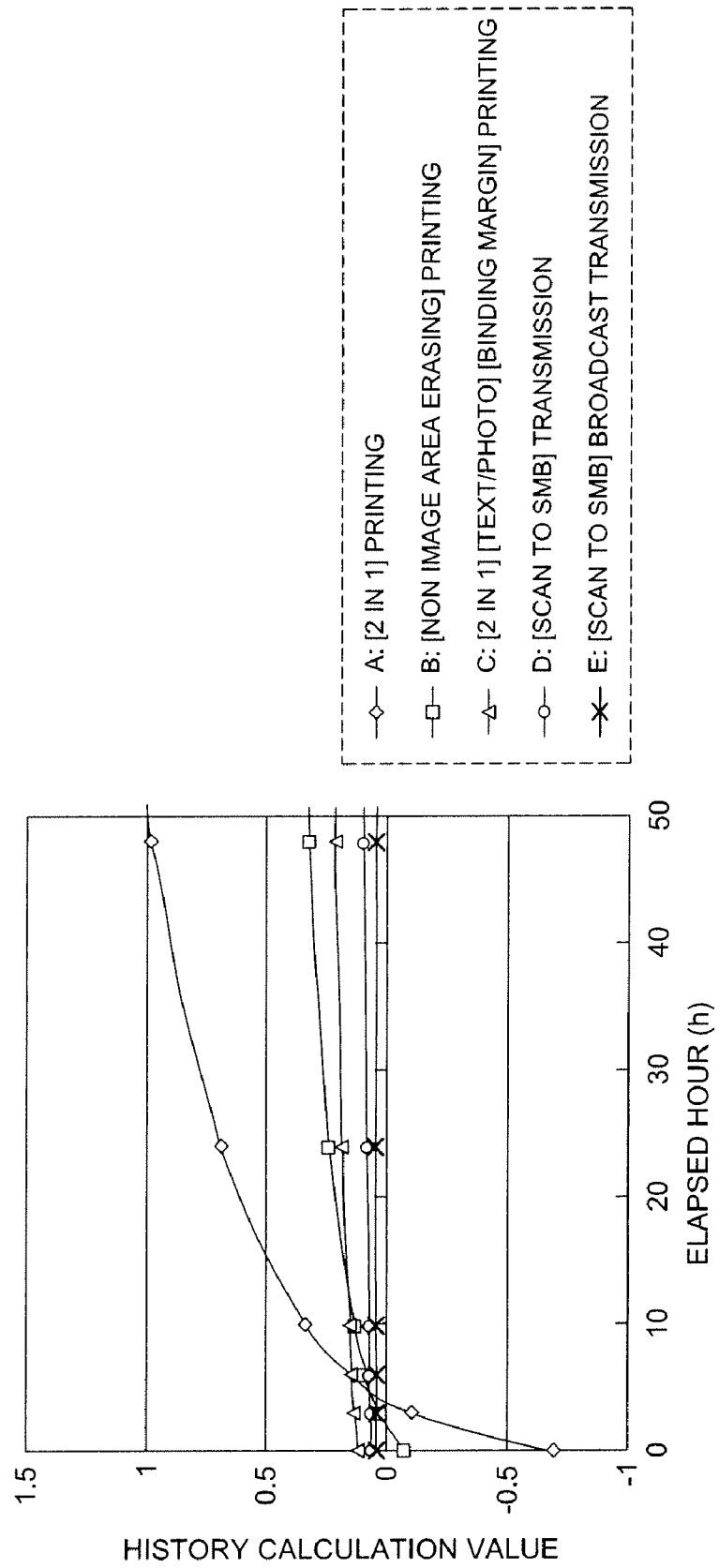
FIG. 19 is a diagram graphically representing the relationship between the elapsed time and correlation number (theoretical history value) of the job using the result of calculation in FIG. 18.

FIG. 18 shows an example of the result of calculating the correlation numbers of the aforementioned five jobs using the aforementioned Formula (1). In this example, only the setting-related coefficient is used to the number of screen changes. The weight determining coefficient for time axis is 5 (y=5), and the elapsed times are 3, 6, 10, 24, 48 and 100 hours. FIG. 19 is a graphic representation of the relationship between the elapsed times and correlation numbers (theoretical history values) of the five jobs using the calculation result in FIG. 18. In the example of this chart, the first job is shown by graphic line A, the second job by graphic line B, the third job by graphic line C, fourth job by graphic line D, and the fifth job by graphic line E.

Correlation numbers are calculated using the aforementioned Formula (1). As shown in FIG. 19, for example, the smaller the setting-related coefficient, the inclination of the graphic line with respect to a increase in elapsed time does not become so small, as exemplified in the A: [2 in 1] printing job wherein the setting-related coefficient is 1, or in the B: [NON IMAGE AREA ERASING] printing job wherein the setting-related coefficient is 3. The greater the setting-related coefficient, the smaller the inclination of the graphic line with respect to a increase in the elapsed time, as exemplified in the E: [Scan to SMB] broadcast transmission job wherein the setting-related coefficient is 21, or in the D: [Scan to SMB] transmission wherein the setting-related coefficient is 11. To put it another way, Formula (1) is formulated in such a way that the jobs with smaller setting-related coefficients have a wider range of increase in the correlation number with the passage of time, than those having greater setting-related coefficients.

In the job history display, the order of display is determined by the order of magnitude of the correlation numbers. To put it more specifically, the history is displayed sequentially from the high to low level starting from the job having the smallest correlation number including the negative value. Further, the order of magnitude in the correlation number varies according to the change of the elapsed time. Thus, the jobs whose history is displayed are re-ordered in conformity to the elapsed time. To put it in greater details, the jobs having smaller setting-related coefficients have a wider range of increase in the correlation number with the process of time, than those having greater setting-related coefficients. With the passage of time, the jobs having smaller setting-related coefficient are displayed on lower levels, whereas the jobs having greater setting-related coefficients are displayed on higher levels.

For example, the result of calculation for 0 hour in FIG. 18 can be obtained at 13:00, Jun. 27, 2007 when correlation number calculation display screen 100 of FIG. 16 is displayed. Accordingly, the order of magnitude in the correlation numbers of five jobs can be shown as A<B<E<D<C. Further, the result of calculation for 6 hours in FIG. 18 can be obtained at 19:00, Jun. 27, 2007 when the correlation number calculation display screen 101 of FIG. 17 is displayed. Thus, the order of magnitude in the correlation numbers of five jobs can be shown as E<D<B<A<C.

Figure 20:
FIGS. 20(A) and (B) are explanatory diagrams showing the changes of the display screen of the job history shown in the operation display section.
Figure 21:
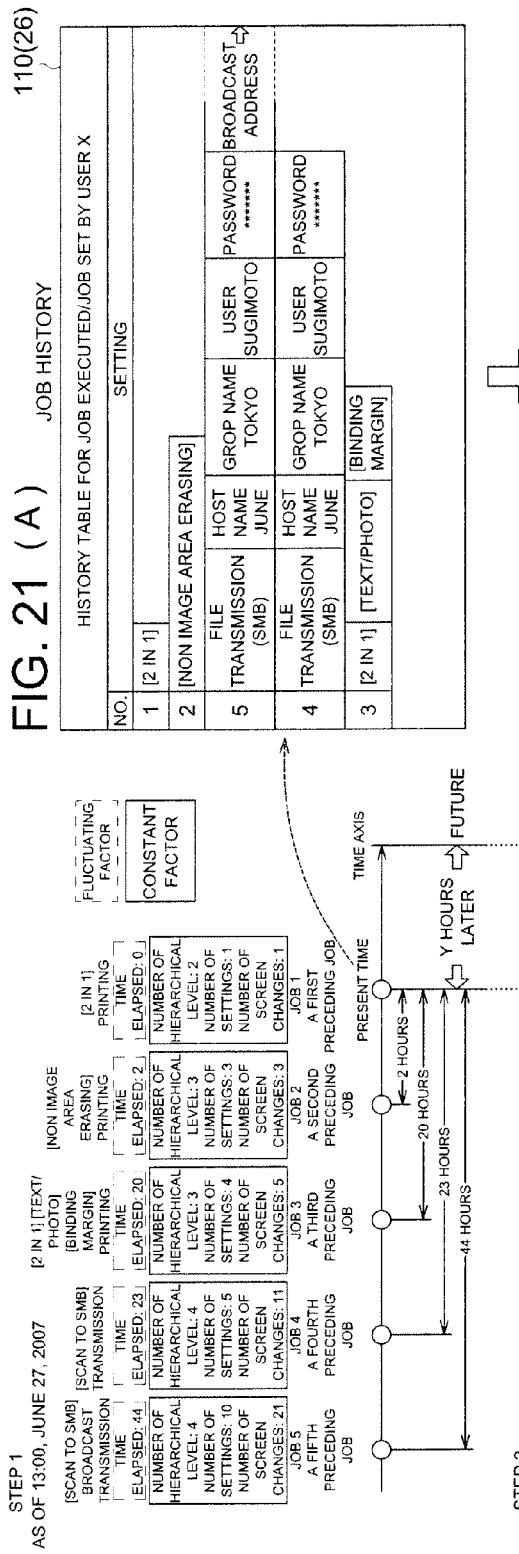
FIGS. 21(A) and (B) are explanatory diagrams showing the overall image of the correspondence between the changes of the job history display screen of FIG. 20 and the elapsed time of the job.
Figure 21:
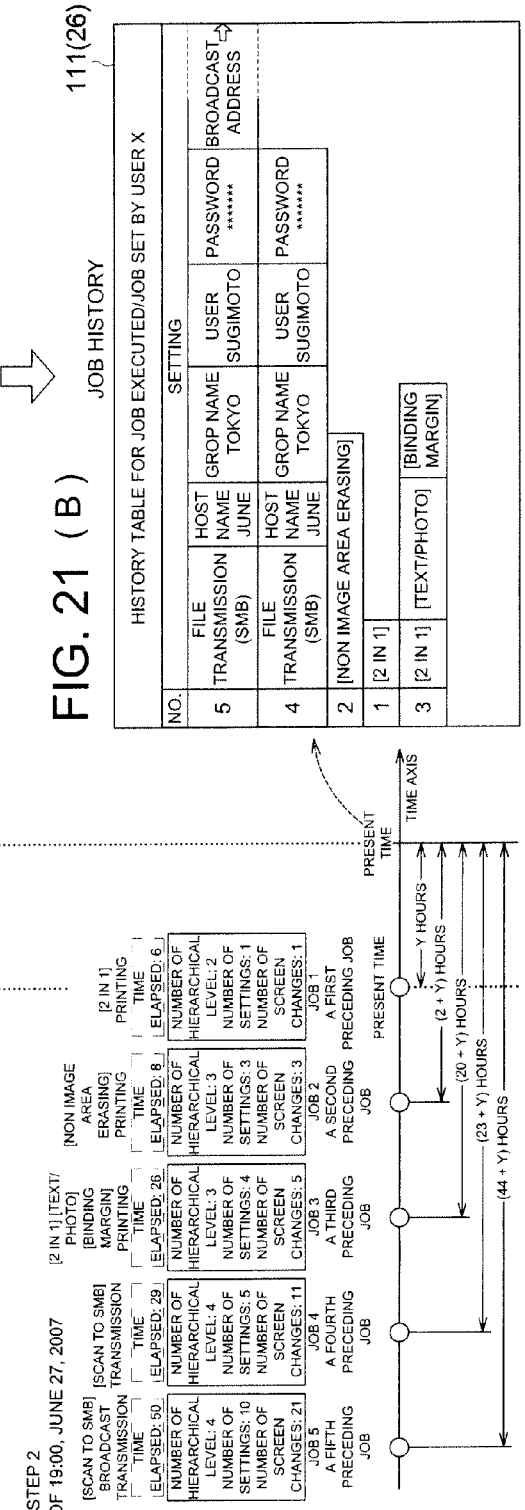

FIGS. 20(A) and (B) illustrate the changes of the display screen of the job history shown in the operation display section 26. FIGS. 21(A) and (B) represent the overall image of the correspondence between the changes of the job history display screen of FIGS. 20(A) and (B) and the elapsed times of five jobs. Y hours of FIG. 21 indicate six hours (Y=6).

The job history display screen shows the order of execution (ordinal number) and setting details of the previously set/executed jobs. For example, when user authentication has not been performed, a predetermined number of jobs (that can be displayed) are selected out of all the jobs previously set/executed by multi-functional peripheral 20, and the history thereof is displayed. Further, when user authentication has been performed, a predetermined number of jobs (that can be displayed) are selected out of the jobs having been set and executed by the authenticated user, and the history thereof is displayed. User name is also displayed in the column of the heading.

FIG. 20(A) and FIG. 21(A) represent a job history display screen 110 at the time shown in FIG. 16. At this time point, the history is displayed in the order of job 1, job 2, job 5, job 4 and job 3 in conformity to the relationship of the correlation numbers (A<B<E<D<C). FIG. 20(B) and FIG. 21(B) show the job history display screen 111 at the time point shown in FIG. 17. At this time point, the history is displayed in the order of job 5, job 4, job 2, job 1 and job 3 in conformity to the relationship of the correlation numbers (E<D<B<A<C). As described above, the order of job history displays is replaced with the lapse of time. The job 1 and job 2 having a smaller setting-related coefficient are displayed on the lower level, while the job 5 and job 4 having a greater setting-related coefficient are displayed on the higher level.

When the job indicated on the aforementioned job history display screen has been pressed (touched) and selected, the multi-functional peripheral 20 allows the settings of the processing conditions of the selected job to be reflected on the settings of the processing conditions of a new job.

Figure 22:
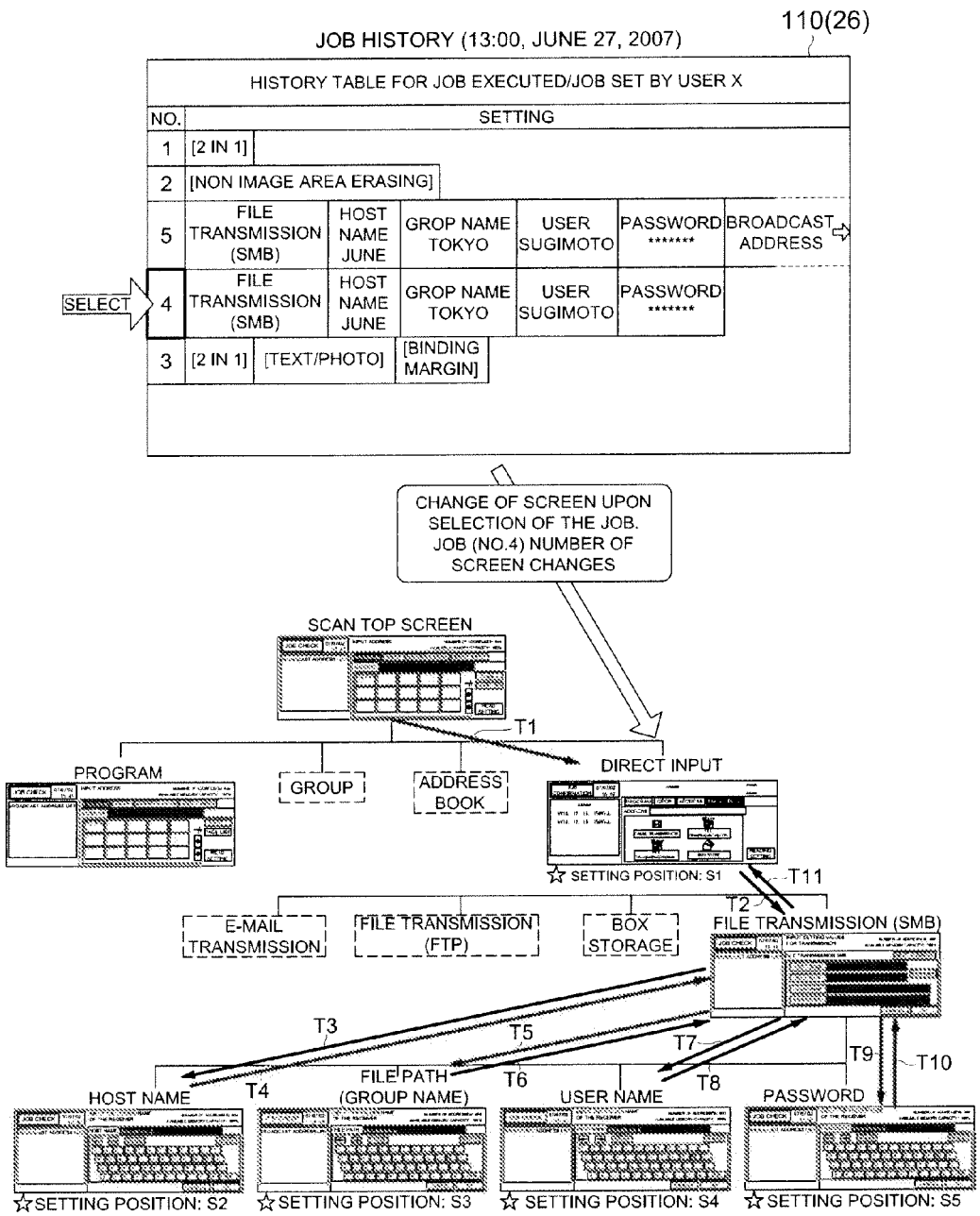
FIG. 22 is an explanatory diagram showing the changes of screens when the job number is selected on the history display screen of FIG. 20(A)

To put it in greater details, the aforementioned function of the multi-functional peripheral 20 is executed by one of the two operations—selection of a job number on the job history display screen and selection of the details of the settings. When the job number has been selected, the screen automatically switches to the operation screen (edit screen) where the selected job has been last set, and the settings of the processing conditions of all the jobs are reflected on the settings of the processing conditions of a new job. When the details of the settings have been selected, the screen automatically switches to the operation screen (edit screen) where the selected settings are shown, and the settings of the processing conditions of all the jobs are reflected on the settings of the processing conditions of a new job. The settings are reflected, for example, by copying of the data on the processing conditions of the selected job to the parameter table of a new job. Further, the setting of the processing conditions of a new job can be changed as desired by the user (by the edit function). The following describes the specific examples of the aforementioned two operations of selection:

FIG. 22 shows the changes of screens when the job number is selected on the history display screen of FIG. 20(A). For example, when No. 4 has been selected on the job history display screen 110, the screen switches to the last setting screen in the [Scan to SMB] transmission of the fourth job. Further, all the processing conditions having been set in the [Scan to SMB] transmission of the fourth job are reflected on the setting of a new job. Similarly, when another job number (one of No. 1, 2, 3 and 5) has been selected, the screen switches to the screen wherein the last setting of the job has been performed, and all the processing conditions having been set for each job are reflected on the settings of a new job.

Figure 23:
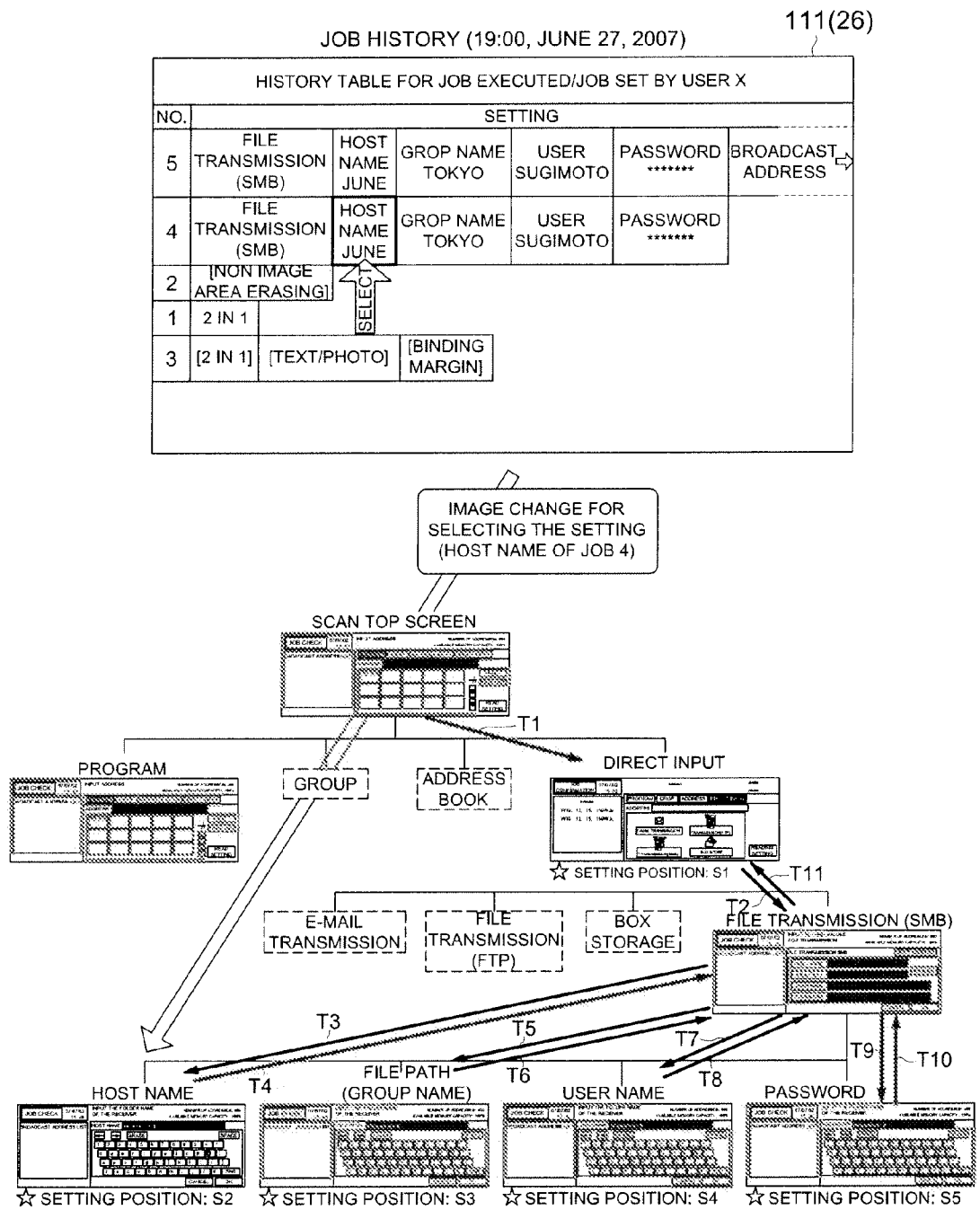
FIG. 23 is an explanatory diagram showing the changes of screens when the setting is selected on the history display screen of FIG. 20(B)

FIG. 23 shows the changes of screens when the setting is selected on the job history display screen 111 of FIG. 20(B). When the "host name June" of the job 4, for example, has been selected on the job history display screen 111, the screen changes to the host name setting screen for the [Scan to SMB] transmission of the fourth job. Further, all the processing conditions having been set in the [Scan to SMB] transmission of the fourth job are reflected on the settings of a new job. Similarly, when another setting (one of group name, user name and password) of the Job 4 has been selected, the screen switches to the screen corresponding to the selected setting, and all the processing conditions having been set in the [Scan to SMB] transmission of the job 4 are reflected on the settings of a new job. Further, when another setting (such as a jib setting of No. 3 or No. 5) has been selected, a similar operation is performed.

Referring to the flow chart, the following describes the storage of information on the operation items at the time of job setting performed by the multi-functional peripheral 20—to put it in greater details, the counting and storage of the number of hierarchical levels, number of settings, and the number of screen changes.

Figure 24:
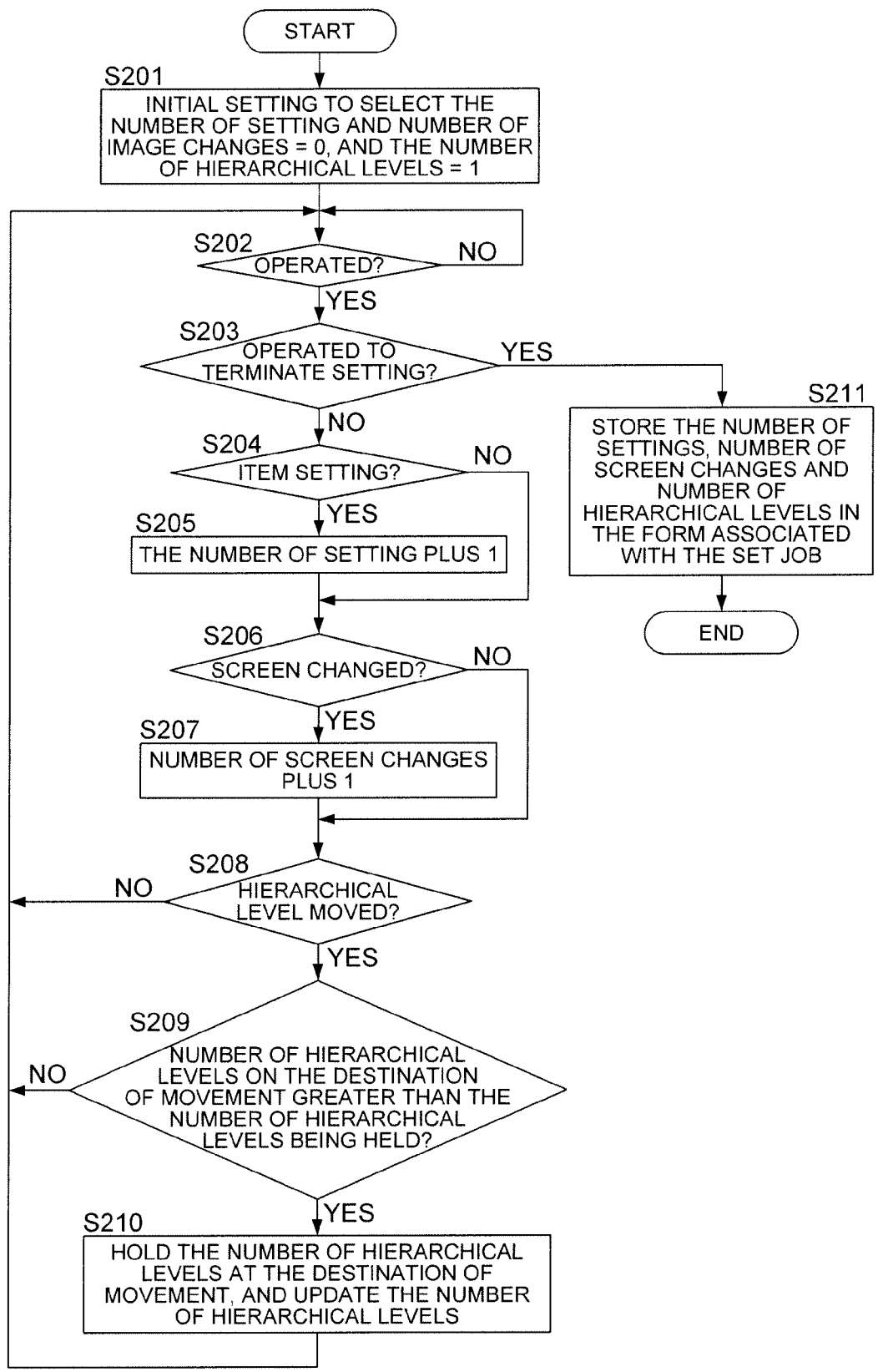
FIG. 24 is a flow diagram showing the process of operation registration performed by the multi-functional peripheral in the embodiment of the present invention.

FIG. 24 shows the process of storing the information on the operations performed by the multi-functional peripheral 20. When the operation screen has been displayed on the operation display section 26, the CPU 21 starts processing illustrated in FIG. 24. With the start of this processing (Start), the CPU 21 initially sets the number of settings to 0, the number of screen changes to 0, and the number of hierarchical levels to 1 (Step S201), and checks if the operation (pressing of the button) on the operation screen displayed on the operation display section 26 has been performed or not (loop of Step S202: No through Step S202) When the operation has been performed (Step S202: Yes), the CPU 21 determines if that operation is the operation for terminating the setting (pressing of the Start key) or not (Step S203). If it is not the operation for terminating the setting (Step S203: No), the CPU 21 determines if that operation is intended to set the item of the job processing conditions or not (the setting operation in FIG. 3 through FIG. 7) (Step S204).

If the operation is an item setting operation (Step S204: Yes), the CPU 21 adds "1" to the number of settings (Step S205), and proceeds the next Step S206. If the operation is not the item setting operation (Step S204: No), the CPU 21 goes directly to the Step S206.

The CPU 21 then determines if there is a screen change or not (Step S206). If there is a screen change (Step S206: Yes), the CPU 21 adds "1" to the number of screen change (Step S207), and proceeds to the Step S208. If there is no screen change (Step S206: No), the CPU 21 directly goes to the Step S208.

The CPU 21 then determines if there is any change in the hierarchical level of operation (Step S208). If there is a change in the hierarchical level of operation (Step S208: Yes), the CPU 21 compares the number of hierarchical levels being held (initial value: 1) and the number of hierarchical levels at the destination of movement, and determines if the number of hierarchical levels at the destination of movement is greater than the number of hierarchical levels being held (Step S209). If the number of hierarchical levels at the destination of movement is greater than the number of hierarchical levels being held (Step S209: Yes), the CPU 21 replaces the number of hierarchical levels being held by the number of hierarchical levels at the destination of movement (Step S210), and goes back to the Step S202. If the number of hierarchical levels at the destination of movement is smaller than the number of hierarchical levels being held (Step S209: No), the CPU 21 directly goes back to the Step S202.

Further, if the operation performed in Step S202 is the operation of terminating the setting (pressing of the Start key) (Step S203: Yes), the CPU 21 associates the number of settings, screen change and the number of hierarchical levels with the job having been set, and stores them in the nonvolatile memory 25 (job history table 40) (Step S211), whereby the present processing terminates (End).

One job setting operation terminates according to the aforementioned procedure, and the CPU 21 executes the job under the set processing conditions. In parallel with the start of the job execution, the CPU 21 allows the operation screen to be displayed on the operation display section 26, and enables the multi-functional peripheral 20 to accept job setting. Then the aforementioned procedure re-starts.

Figure 25:
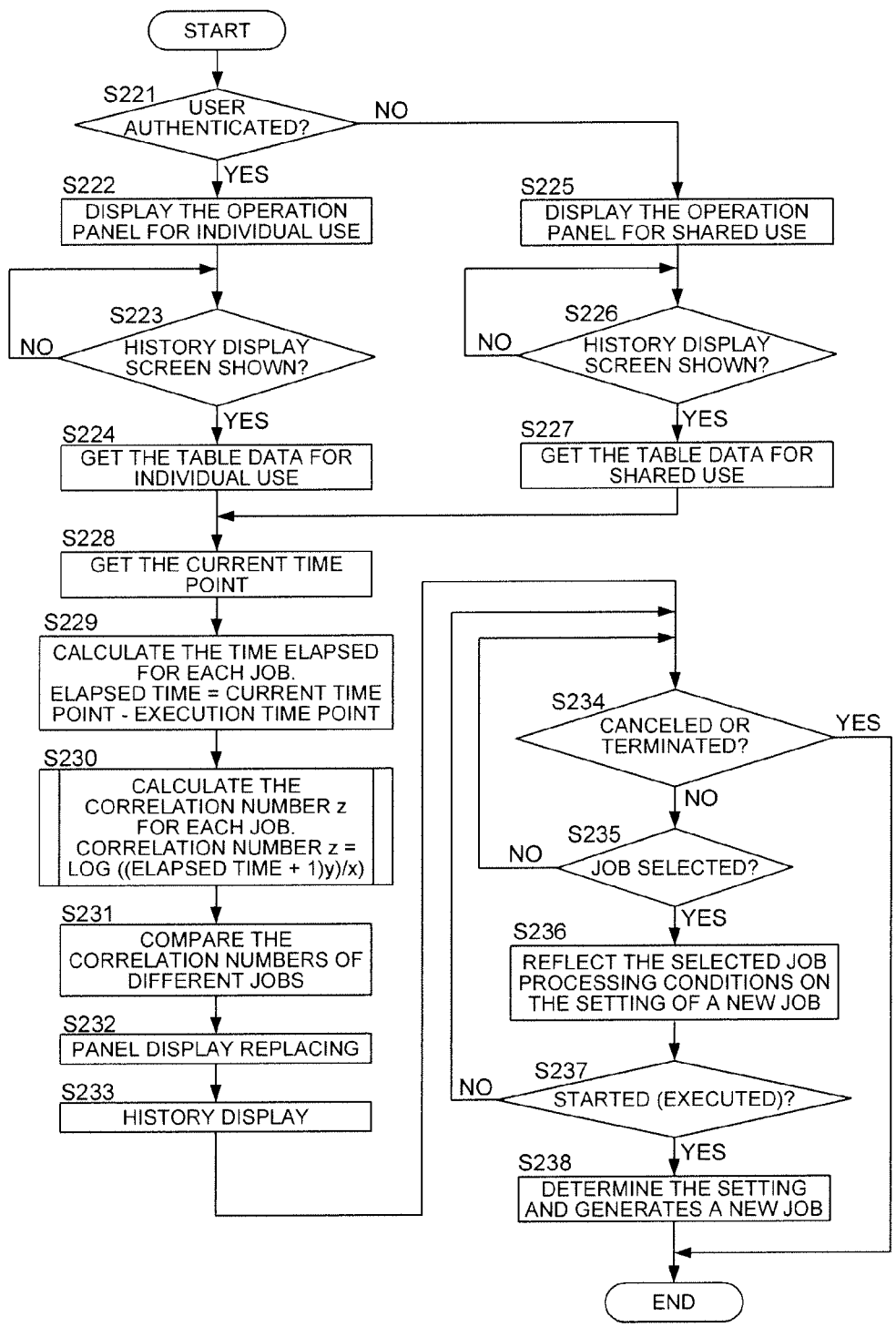
FIG. 25 is a flow diagram showing the process of job history display performed by the multi-functional peripheral in the embodiment of the present invention.

Referring to the flow chart, the following describes the details of the processing of the history display of the job performed by the multi-functional peripheral 20:

FIG. 25 shows the process of job history display performed by the multi-functional peripheral. With the start of processing shown in FIG. 25 (Start), the CPU 21 checks if user authentication has been performed or not (Step S221). If user authentication has been performed (Step S221: Yes), the CPU 21 allows the operation screen for individual use (operation panel for individual use) to be displayed on the operation display section 26 (Step S222), and checks if there is any request of display on the job history display screen or not—i.e., if the history display key has been pressed or not (loop of Step S223: No through Step S223).

If there is any request of display on the job history display screen (Step S223: Yes), the CPU 21 acquires the table data for individual use to perform history display (Step S224). To put it in greater details, the CPU 21 acquires the table data (job execution order data, execution time point (date and time) data, setting description data) of the job having been set/ executed by the authenticated user, according to the user name data registered on the job history table 40 of FIG. 15.

If user authentication has not been performed (Step S221: No), the CPU 21 displays the operation screen (operation panel for shared use) for shared use by the operation display section 26 (Step S225), and checks if there is any request for job history display screen display or not —i.e., if the history display key has been pressed or not (loop of Step S226: No through Step S226). If there is any request for job history display screen display (Step S226: Yes), the CPU 21 acquires the table data for shared use to display history (Step S227). To be more specific, the table data (job execution order data, execution time point (date and time) data, and setting description data) of all the jobs registered in the job history table 40 of FIG. 15.

After having acquired the table data for individual use or for shared use, the CPU 21 acquires the current information on time point from the clock 31 (Step S228). Then the CPU 21 calculates the elapsed time for each job having obtained (Step S229). This elapsed time is obtained by subtracting the job execution time point from the current time point (the elapsed time=current time point−execution time point). Further, the CPU 21 calculates the correlation number (z) of each job according to the subroutine to be described later (Step S230).

After calculating the correlation number, the CPU 21 compares the correlation numbers of different jobs (Step S231), and changes the order of job display (replacing) (Step S232), job history is displayed on the operation display section 26 according to the new order (Step S233). To put it more specifically, history is displayed from higher to lower levels sequentially, starting from the job having the smallest correlation number.

After the job history display screen appears, the CPU 21 checks whether or not the operation is performed to cancel or terminate the display on the job history display screen (pressing of the Cancel key or End key). The CPU 21 also checks if the job (number or setting description) has been selected or not on the job history display screen (loop of Step S234: No through Step S235: No through Step S234).

If the operation has been performed to cancel or terminate the display on the job history display screen (Step S234: Yes), the CPU 21 terminates the current processing (End). If the job has been selected (Step S235: Yes), the CPU 21 ensures the setting of the processing conditions of the selected job to be reflected on the setting of a new job (Step S236).

If the Start (execution) operation (pressing of the Start key (execution key) has been performed (Step S237: Yes) under this condition, the CPU 21 determines the setting of a new job. Namely, the CPU 21 determines the setting of a new job under the processing conditions of the selected job, generates the new job (Step S237), and terminates the current processing (End). Further, when the setting of the processing conditions of a new job has been changed by the user, the CPU 21 determines the setting under the new processing conditions and generates a new job. The CPU 21 executes the job having been generated by the aforementioned processing, according to the processing conditions having been set.

If operation has been performed to cancel or terminate the display on the job history display screen (Step S234: Yes) without the start (execution) operation being performed (Step S237: No), the CPU 21 cancels the setting of a new job and terminates the current processing (End). If the job has been selected again on the job history display screen (Step S234: Yes) without the start (execution) operation being performed (Step S237: No) (Step S234: No through Step S235: Yes), the CPU 21 ensures the setting of the processing conditions of the selected job to be reflected on the setting of a new job (Step S236), and performs the procedures of Step S237 and thereafter.

The following describes the subroutine for calculating the correction number, provided to process the aforementioned job history display:

FIG. 26 shows the process of calculating the correlation number by the multi-functional peripheral 20. With the start of processing of FIG. 26 (Start), the CPU 21 acquires the operation description data from the job history table 40 of the nonvolatile memory 25, and calculates the setting-related coefficient (x) using the aforementioned Formula (2) (Step S241). Out the number of hierarchical levels, number of settings and screen change, one type or more of the data selected freely by the user for the purpose of calculating the correlation number, and the weight determining coefficients (α, β and γ) corresponding thereto are acquired. Further, the CPU 21 acquires the weight determining coefficient (y) for time axis from the nonvolatile memory 25 (Step S242).

The CPU 21 calculates the correlation number (z) by substituting the elapsed time, coefficient (y) and the setting-related coefficient (x) into the aforementioned Formula (1) (Step S243), and terminates this processing (End).

As described above, in the multi-functional peripheral 20 of the present embodiment, when the history of the previous job setting is displayed, the order of importance of the job is determined in response to the degree of complexity of the operation when job processing conditions are set. With the lapse of time from the time of job generation, the jobs of lower order of importance (lower degree of complexity in operation) are subjected to greater reduction of display priority than the jobs in the higher order of importance, and the jobs in the higher order of importance are displayed in higher order (higher order of priority) than the jobs in the lower order of importance. This arrangement ensures that the jobs in the higher order of importance are displayed on a higher level with the lapse of time, whereby easy detection by a user is enabled.

In the multi-functional peripheral 20, when the jobs with their history displayed have been selected, the setting of the processing conditions of the selected jobs are reflected on the setting of the processing conditions of a new job. Thus, effective creation of a new job is enabled using the previous settings through direct use of the previous setting or partial change of the previous setting.

The multi-functional peripheral 20 has a user authentication function. When the user authentication has been performed, this function selects the jobs having been set and executed by the authenticated user, and displays the history of these jobs. In the setting of the job processing conditions, there is a particular propensity according to each user in many cases. Thus, the setting of the jobs having a greater utility value to the user can be provided on a preferential basis by selecting the previous jobs related to each user, and displaying the history of these jobs.

Further, the multi-functional peripheral 20 permits a free choice of the criteria used for the decision of replacing in a plurality of jobs whose history is displayed—to be more specific, the conditions for threshold values such as the number of hierarchical levels of operations, number of settings, number of screen changes, weight determining coefficient (y) with respect to time axis and weight determining coefficients (α), (β) and (γ) wherein these conditions are used to calculate the correlation number (z) and the setting-related coefficient (x). This arrangement allows replacing (customization) to be performed in conformity to each of the user specifications.

The embodiments of the present invention have been described with reference to diagrams. It is to be expressly understood, however, that the specific structure of the present invention is not restricted thereto. The present invention can be embodied in a great number of variations with appropriate modification or additions, without departing from the technological spirit and scope of the invention claimed.

For example, in the aforementioned embodiments, the data on the number of hierarchical levels, number of settings and number of screen changes denoting information of operation items is registered into the job history table 40. However, operation items can be determined according to the settings without the aforementioned data being registered. In this case, the setting position and the deepest hierarchical level of operation can be obtained from the settings. Thus, the number of settings and the number of hierarchical levels can be calculated from the settings. Further, analysis of the settings provides the shortest route of operations from the top screen to the operation screen capable of determining the settings (for job execution) through the setting position operation screen. The number of screen changes can also be calculated from the settings.

In the aforementioned embodiments, a plurality of jobs whose history is displayed are replaced using the correlation number calculated for each job based on the operation items at the time of setting the job and the time elapsed from the time point of job generation. The calculation formula for obtaining this correlation number is not restricted to the Formula (1) described with reference to the embodiment. Any calculation formula can be used if the result of calculation is such that the correlation number of the jobs in the lower order of importance has a wider range of increment with the lapse of time than that of the jobs in the higher order of importance. Any calculation formula can be used if it meets the requirement that, with the lapse of time from the job generation time point, the jobs in the lower order of importance is subjected to a greater reduction in the order of display priority than the jobs in the higher order of importance. For example, display priority can be obtained using the following Formula (3):

$$\text{Priority} = \text{initial value}/(1 + \text{the elapsed time} \ast (1/\text{the order of importance of a job})) \quad (3)$$

The "initial value" in Formula (3) is the same for all jobs, and "the order of importance of a job" (operation items at the time of job setting) corresponds to the setting-related coefficient (x) of Formula (1) in the aforementioned embodiment. In this case, jobs of higher priority are displayed on a higher level (more preferentially).

The initial priority of the jobs when the history of a plurality of jobs is displayed can be determined according to the order of importance of the job. Alternatively, it can be the same independently of the order of importance of a job. For example, when Formula (1) described with reference to the embodiment is used, the initial priority in the order of each job is determined according to the order of importance. When the Formula (3) is used, the initial priority is the same for all jobs. In this case, immediately after execution of the latest job, the history of jobs is displayed in chronological order as in the conventional method, and with the lapse of time, jobs are replaced according to the order of importance. To be more specific, with the lapse of time from the job generation, the jobs in the lower order of importance are subjected to greater reduction in the order of priority than the jobs in the higher order of importance. Further, even when the Formula (1) is used, the setting-related coefficient (x) of each job is fixed for N hours (e.g., for 30 minutes through one hour) after execution of the latest job, whereby the history of jobs is displayed in chronological order for N hours.

The time elapsed from the time point of job setting/execution to the display of the correlation number calculation display screen or job history display screen (at present) is calculated by acquiring the information on time point from the clock 31. A timer can be used instead of this clock.

In the embodiment, upon generation of the job under the processing conditions having been set by the operations of the operation display section, the job information including the processing conditions of that job is stored. Using this job information, the operation display section displays a plurality of previously set jobs in a predetermined order. This display replaces the order of a plurality of jobs based on contents of the operations display section when the processing conditions is set and the lapsed time during displaying.

For example, the order of importance of the job is determined according to the degree of operation complexity at the time of setting the processing conditions. With the passage of time after the job generation, the jobs in the lower order of importance are assigned with lower display priority than those in the higher order of importance, and the jobs in the higher order of importance are displayed on a higher level than those in the lower order of importance. This arrangement ensures that the jobs in the higher order of importance are displayed on the higher level despite the passage of time, with the result that jobs in the higher order of importance can be found out easily by the user.

In the aforementioned inventions, the order of a plurality of jobs displayed is changed according to the number of hierarchical levels of operations, number of settings and the number of screen changes. For example, with the passage of time after job generation, the jobs having a greater number of hierarchical levels of operations, greater number of settings and greater number of screen changes are displayed in the higher order of precedence than the jobs having smaller values.

According to the present invention, when replacing the job processing conditions using the previous settings, display is given in conformity to the user requirements, with consideration given to the information on operations and the elapsed time.

What is claimed is:

1. An information processing apparatus comprising:
   an operation display section for displaying a screen to set processing conditions relating to a job and for receiving an operation to set the processing conditions relating to the job;
   a generation section for generating a job under the processing conditions set by the operation with the operation display section;
   a storage section for storing job information comprising the processing conditions relating to the job generated by the generation section;
   a measuring section for measuring an elapsed time from a time when the job is generated by the generation section; and
   a control section configured to perform at least the following operations:
   displaying a plurality of previously generated jobs in a predetermined order using the job information on the operation display section,
   determining an order of the importance based on a degree of complexity of operation when the processing conditions are set for each job,
   calculating a display priority of each job based on the order of the importance and the elapsed time of each respective job, wherein the display priority is calculated so as to decrease according to an elapsed time, wherein the amount of decrease per unit time of the display priority of the job in the lower order of importance is larger than the amount of decrease per unit time of the display priority of the job in the higher order of importance, and replacing a display order of the plurality of the jobs so that the job having a higher display priority is displayed in a higher display order.

2. The information processing apparatus of claim 1, wherein, in case when the job displayed on the operation display section is selected, settings of the processing conditions of the selected job are reflected on the settings of the processing conditions of a new job.

3. The information processing apparatus of claim 1, further comprises an authentication section for authenticating a user who sets the job processing conditions by operating the operation display section, based on registered authentication information, wherein, the control section relates the authentication information of the user to the job information and stores on the storage section when the job is generated by the user authenticated by the authentication section, and selects the job information based on the authentication information relating to the user and displays jobs previously generated by the user, when the screen of the user authenticated by the authentication section is displayed.

4. The information processing apparatus of claim 1, wherein, the information of the operations performed comprising at least one of a number of hierarchical levels of operations, a number of settings of items relating to the job processing conditions and a number of screen changes from a start of the operation for setting the information of the operations performed to a termination.

5. The information processing apparatus of claim 1, wherein a criteria used for a decision of replacing order of a plurality of the jobs is changeable.

6. The information processing apparatus of claim 1, wherein, the storage section stores the information of the operations performed.

7. A non-transitory computer readable recording medium storing a program which causes an information processing apparatus comprising an operation display section and a storage section, executes a method comprising:

displaying a screen to set a processing conditions relating to a job on the operation display section and receiving an operation to set the processing conditions relating to the job;

generating a job under the processing conditions set by the operation with the operation display section;

storing job information comprising the processing conditions of the generated job;

measuring an elapsed time from a time when the job is generated;

displaying a plurality of previously generated jobs in a predetermined order using the job information on the operation display section;

determining an order of the importance based on a degree of complexity of operation when the processing conditions are set for each job;

calculating a display priority of each job based on the order of the importance and the elapsed time of each respective job;

wherein the display priority is calculated so as to decrease according to an elapsed time;

wherein the amount of decrease per unit time of the display priority of the job in the lower order of importance is larger than the amount of decrease per unit time of the display priority of the job in the higher order of importance; and replacing a display order of the plurality of the jobs so that the job having a higher display priority is displayed in a higher display order.

8. The non-transitory computer readable recording medium of claim 7, wherein, in case when the job displayed on the operation display section is selected, the method further comprises reflecting a settings of the processing conditions of selected job on the settings of the processing conditions of a new job.

9. The non-transitory computer readable recording medium of claim 7, wherein the method further comprises authenticating a user who sets the job processing conditions by operating the operation display section based on registered authentication information, relating the authentication information of the user to the job information and storing on the job generating by the authenticated user, selecting the job information based on the authentication information relating to the user and displaying the previously set jobs, when the screen of the user authenticated is displayed.

10. The non-transitory computer readable recording medium of claim 7, wherein, the information of the operations performed comprises at least one of a number of hierarchical levels of operations, a number of settings of items relating to the job processing conditions and a number of screen changes from a start of the operation for setting the information of the operations performed to the termination.

11. The non-transitory computer readable recording medium of claim 7, wherein a criteria used decision of replacing order of a plurality of the jobs is changeable.

12. The non-transitory computer readable recording medium of claim 7, wherein the method further comprises storing the information of the operations performed.

13. An information processing method employed by an information processing apparatus comprising an operation display section and a storage section, the information processing method comprising:

displaying the screen to set processing conditions of a job on the operation display section and receiving the operations;

generating a job under the processing conditions set by the operation of the operation display section;

storing the job information comprising the processing conditions of the generated job;

measuring an elapsed time from a time when the job is generated;

displaying a plurality of previously generated jobs in a predetermined order using the job information on the operation display section;

determining an order of the importance based on a degree of complexity of operation when the processing conditions are set for each job;

calculating a display priority of each job based on the order of the importance and the elapsed time of each respective job;

wherein the display priority is calculated so as to decrease according to an elapsed time;

wherein the amount of decrease per unit time of the display priority of the job in the lower order of importance is larger than the amount of decrease per unit time of the display priority of the job in the higher order of importance; and replacing a display order of the plurality of the jobs so that the job having a higher display priority is displayed in a higher display order.

* * * * *